United States Patent
Manolakos et al.

(10) Patent No.: US 11,909,589 B2
(45) Date of Patent: *Feb. 20, 2024

(54) CONSTRAINTS ON A SOURCE REFERENCE SIGNAL FOR QUASI-COLLOCATION TIMING REFERENCE OF A POSITIONING REFERENCE SIGNAL

(71) Applicant: QUALCOMM Incorporated, San Diego, CA (US)

(72) Inventors: Alexandros Manolakos, Escondido, CA (US); Sony Akkarakaran, Poway, CA (US); Guttorm Ringstad Opshaug, Redwood City, CA (US); Sven Fischer, Nuremberg (DE); Arash Mirbagheri, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/029,989

(22) Filed: Sep. 23, 2020

(65) Prior Publication Data

US 2021/0105182 A1 Apr. 8, 2021

Related U.S. Application Data

(60) Provisional application No. 62/910,279, filed on Oct. 3, 2019.

(51) Int. Cl.
*H04L 41/0806* (2022.01)
*H04L 5/00* (2006.01)
(Continued)

(52) U.S. Cl.
CPC ............ *H04L 41/0806* (2013.01); *G01S 5/10* (2013.01); *H04L 5/001* (2013.01); *H04L 5/0032* (2013.01);
(Continued)

(58) Field of Classification Search
None
See application file for complete search history.

(56) References Cited

U.S. PATENT DOCUMENTS

2018/0091212 A1* 3/2018 Lee .................... H04L 5/0048
2018/0278467 A1* 9/2018 John Wilson ..... H04W 72/0413
(Continued)

FOREIGN PATENT DOCUMENTS

| EP | 4156810 A1 | 3/2023 |
| WO | 2019157750 A1 | 8/2019 |
| WO | WO-2019179261 A1 * | 9/2019 |

OTHER PUBLICATIONS

U.S. Appl. No. 62/886,145, filed Aug. 13, 2019, Zarifi (Year: 2019).*

(Continued)

*Primary Examiner* — Jay L Vogel
(74) *Attorney, Agent, or Firm* — QUALCOMM Incorporated

(57) ABSTRACT

Disclosed are techniques related to wireless communications. In an aspect, a network entity determines whether a source reference signal transmitted from a first transmission-reception point (TRP) is a quasi-collocation (QCL) source of a target reference signal transmitted from a second TRP based, at least in part, on a first bandwidth (BW) portion occupied by the source reference signal and a second BW portion occupied by the target reference signal, the first BW portion having a first start frequency and a first BW size and the second BW portion having a second start frequency and a second BW size, and configures a user equipment (UE) with the source reference signal as the QCL source of the target reference signal when it is so determined.

44 Claims, 18 Drawing Sheets

(51) Int. Cl.
- *G01S 5/10* (2006.01)
- *H04W 72/0453* (2023.01)
- *H04L 41/0896* (2022.01)
- *H04L 43/0864* (2022.01)
- *H04W 64/00* (2009.01)
- *G01S 5/06* (2006.01)
- *H04L 25/02* (2006.01)
- *H04L 43/16* (2022.01)
- *H04L 27/26* (2006.01)
- *G01S 5/02* (2010.01)
- *G01S 5/04* (2006.01)

(52) U.S. Cl.
CPC ........ *H04L 5/0048* (2013.01); *H04L 41/0896* (2013.01); *H04L 43/0864* (2013.01); *H04W 64/00* (2013.01); *H04W 72/0453* (2013.01); *G01S 5/0226* (2013.01); *G01S 5/04* (2013.01); *G01S 5/06* (2013.01); *H04L 5/0023* (2013.01); *H04L 5/0064* (2013.01); *H04L 25/0224* (2013.01); *H04L 27/261* (2013.01); *H04L 43/16* (2013.01)

(56) References Cited

U.S. PATENT DOCUMENTS

| | | |
|---|---|---|
| 2018/0288755 A1 | 10/2018 | Liu et al. |
| 2019/0090273 A1 | 3/2019 | Yoo et al. |
| 2019/0174466 A1 | 6/2019 | Zhang et al. |
| 2019/0199406 A1 | 6/2019 | Wang et al. |
| 2019/0222284 A1 | 7/2019 | Huang |
| 2019/0297603 A1 | 9/2019 | Guo et al. |
| 2019/0373602 A1 | 12/2019 | Qin et al. |
| 2020/0389883 A1 | 12/2020 | Faxer et al. |
| 2021/0050963 A1* | 2/2021 | Zarifi ................. H04W 48/16 |
| 2021/0083816 A1 | 3/2021 | Werner et al. |
| 2021/0091900 A1* | 3/2021 | Zhang ................. H04L 5/0023 |
| 2021/0120519 A1* | 4/2021 | Si ........................ H04L 5/0048 |
| 2021/0194765 A1* | 6/2021 | Manolakos ......... H04L 41/0896 |
| 2021/0359813 A1 | 11/2021 | Huang et al. |
| 2021/0409167 A1* | 12/2021 | Shi .................... H04W 72/042 |
| 2022/0029692 A1 | 1/2022 | Yang et al. |
| 2022/0167181 A1* | 5/2022 | Yu ....................... H04W 16/28 |

OTHER PUBLICATIONS

International Search Report and Written Opinion—PCT/US2020/052493—ISA/EPO—dated Dec. 23, 2020.

* cited by examiner

| and | Name | Mode | | | Downlink (MHz) | | | Bandwidth DL/UL (MHz) |
|---|---|---|---|---|---|---|---|---|
| | | | | | Start/Middle/End | | | |
| 41 | TD 2600+ | TD | 15 30 | 3 6 | 2496 | 2593 | 2690 | 194 |
| n77 | TD 3700 | TD | 15 30 | 1 2 | 3300 | 3750 | 4200 | 900 |
| n78 | TD 3500 | TD | 15 30 | 1 2 | 3300 | 3550 | 3800 | 500 |
| n79 | TD 4500 | TD | 15 30 | 1 2 | 4400 | 4700 | 5000 | 600 |

*FIG. 7*

NR Band Overlap

| Band | Name | Mode | Band overlap | |
|------|------|------|--------------|---|
| | | | Full (MFBI) | Partial |
| FR1 | | | | |
| n1 | 2100 | FD | n84 | n2, n25, n66 |
| n2 | 1900 PCS | FD | n25 | n1, n3, n39, n84 |
| n3 | 1800 | FD | n80, n86 | n2, n25 |
| n5 | 850 | FD | | n8, n20, n81, n82 |
| n7 | 2600 | FD | n41 | |
| n8 | 900 | FD | n81 | n5 |
| n12 | 700 a | FD | | n28, n83 |
| n20 | 800 | FD | n82 | n5, n28 |
| n25 | 1900+ | FD | n2 | n1, n3, n39, n84 |
| n28 | 700APT | FD | n83 | n12, n20 |
| n34 | TD 2000 | TD | | n70 |
| n38 | TD 2600 | TD | n41 | |
| n39 | TD 1900+ | TD | | n2, n25 |
| n40 | TD 2300 | TD | | |
| n41 | TD 2600+ | TD | n7,n38 | |
| n50 | TD 1500+ | TD | n75 | n74 |
| n51 | TD 1500- | TD | n76 | n74 |
| n66 | AWS-3 | FD | n80, n86 | n3, n80 |
| n70 | AWS-4 | FD | | n34 |
| n71 | 600 | FD | | |
| n74 | L-band | FD | | n50, n75 |
| n75 | DL 1500+ | SD | n50 | n74 |
| n76 | DL 1500- | SD | n51 | n74 |
| n77 | TD 3700 | TD | n78 | |
| n78 | TD 3500 | TD | n77 | |
| n79 | TD 4500 | TD | | |
| n80 | UL 1800 | SU | n3, n66, n86 | |
| n81 | UL 900 | SU | n8 | n5 |
| n82 | UL 800 | SU | n20 | n5 |
| n83 | UL 700 | SU | n28 | n12 |
| n84 | UL 2100 | SU | n1 | n2, n25 |
| n86 | UL AWS | SU | n3, n66, n80 | n3 |
| FR2 | | | | |
| n257 | 28 GHz | TD | n261 | n258 |
| n258 | 26 GHz | TD | | n257 |
| n260 | 39 GHz | TD | | |
| n261 | 28 GHz US | TD | n257 | |

*FIG. 8*

*FrequencyInfoDL* information element

```
-- ASN1START
-- TAG-FREQUENCYINFODL-START
FrequencyInfoDL ::=         SEQUENCE {
    absoluteFrequencySSB        ARFCN-ValueNR                                   OPTIONAL,   -- Cond SpCellAdd
    frequencyBandList           MultiFrequencyBandListNR,
    absoluteFrequencyPointA     ARFCN-ValueNR,
    scs-SpecificCarrierList     SEQUENCE (SIZE (1..maxSCSs)) OF SCS-specificCarrier,
    ...
}
-- TAG-FREQUENCYINFODL-STOP
-- ASN1STOP
```

*FIG. 9*

```
MeasObjectNR ::=            SEQUENCE {
    ssbFrequency                ARFCN-ValueNR                                                               Optional,  -- Cond
    SSBorAssociatedSSB
    ssbSubcarrierSpacing        SubcarrierSpacing                                                           Optional,  -- Cond
    SSBorAssociatedSSB
    smtc1                       SSB-MTC                                                                     Optional,  -- Cond
    SSBorAssociatedSSB
    smtc2                       SSB-MTC2                                                                    Optional,  -- Cond
    IntraFreqConnected
    refFreqCSI-RS               ARFCN-ValueNR                                                               Optional,  -- Cond CSI-RS
    referenceSignalConfig       ReferenceSignalConfig,
    absThreshSS-BlocksConsolidation        ThresholdNR                                                      Optional,  -- Need R
    absThreshCSI-RS-Consolidation          ThresholdNR                                                      Optional,  -- Need R
    nrofSS-BlocksToAverage              INTEGER (2..maxNrofSS-BlocksToAverage)                              Optional,  -- Need R
    nrofCSI-RS-ResourcesToAverage       INTEGER (2..maxNrofCSI-RS-ResourcesToAverage)                       Optional,  -- Need R
    quantityConfigIndex                 INTEGER (1..maxNrofQuantityConfig),
    offsetMO                            Q-OffsetRangeList,
    cellsToRemoveList                   PCI-List                                                            Optional,  -- Need N
    cellsToAddModList                   CellsToAddModList                                                   Optional,  -- Need N
    blackCellsToRemoveList              PCI-RangeIndexList                                                  Optional,  -- Need N
    blackCellsToAddModList              SEQUENCE (SIZE (1..maxNrofPCI-Ranges)) OF PCI-RangeElement          Optional,  -- Need N
    whiteCellsToRemoveList              PCI-RangeIndexList                                                  Optional,  -- Need N
    whiteCellsToAddModList              SEQUENCE (SIZE (1..maxNrofPCI-Ranges)) OF PCI-RangeElement          Optional,  -- Need N
    ...,
    [[ freqBandIndicatorNR-v1530         FreqBandIndicatorNR                                                Optional,  -- Need R
       measCycleSCell-v1530              ENUMERATED {sf160, sf256, sf320, sf512, sf640, sf1024, sf1280}     Optional
    ]]
}
```

CONSTRAINTS ON A SOURCE REFERENCE SIGNAL FOR QUASI-COLLOCATION TIMING REFERENCE OF A POSITIONING REFERENCE SIGNAL

CROSS-REFERENCE TO RELATED APPLICATIONS

The present Application for Patent claims the benefit of U.S. Provisional Application No. 62/910,279, entitled "CONSTRAINTS ON A SOURCE REFERENCE SIGNAL FOR QUASI-COLLOCATION TIMING REFERENCE OF A POSITIONING REFERENCE SIGNAL," filed Oct. 3, 2019, assigned to the assignee hereof, and expressly incorporated herein by reference in its entirety.

FIELD OF THE DISCLOSURE

Aspects of the disclosure relate generally to wireless communications.

DESCRIPTION OF THE RELATED ART

Wireless communication systems have developed through various generations, including a first-generation analog wireless phone service (1G), a second-generation (2G) digital wireless phone service (including interim 2.5G networks), a third-generation (3G) high speed data, Internet-capable wireless service and a fourth-generation (4G) service (e.g., LTE or WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

A fifth generation (5G) wireless standard, also referred to as New Radio (NR), enables higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large wireless deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

One or more aspects may be directed to a network entity. The network entity may comprise a transceiver, a memory, and a processor communicatively coupled to the transceiver and the memory. The processor, the memory, and/or the transceiver may be configured to determine whether a source reference signal transmitted from a first transmission-reception point (TRP) is a quasi-collocation (QCL) source of a target reference signal transmitted from a second TRP based, at least in part, on a first bandwidth (BW) portion occupied by the source reference signal and a second BW portion occupied by the target reference signal. The first BW portion may have a first start frequency and a first BW size, and the second BW portion may have a second start frequency and a second BW size. The processor, the memory, and/or the transceiver may also be configured to configure a user equipment (UE) with the source reference signal as the QCL source of the target reference signal when it is so determined.

One or more aspects may be directed to a method of a network entity. The method may comprise determining whether a source reference signal transmitted from a first TRP is a QCL source of a target reference signal transmitted from a second TRP based, at least in part, on a first BW portion occupied by the source reference signal and a second BW portion occupied by the target reference signal. The first BW portion may have a first start frequency and a first BW size, and the second BW portion may have a second start frequency and a second BW size. The method may also comprise configuring a UE with the source reference signal as the QCL source of the target reference signal when it is so determined.

One or more aspects may also be directed to a network entity. The network entity may comprise means for determining whether a source reference signal transmitted from a first TRP is a QCL source of a target reference signal transmitted from a second TRP based, at least in part, on a first BW portion occupied by the source reference signal and a second BW portion occupied by the target reference signal. The first BW portion may have a first start frequency and a first BW size, and the second BW portion may have a second start frequency and a second BW size. The network entity may also comprise means for configuring a UE with the source reference signal as the QCL source of the target reference signal when it is so determined.

One or more aspects may be directed a non-transitory computer-readable medium storing computer-executable instructions for a network entity. The computer-executable instructions may comprise one or more instructions instructing the network entity to determine whether a source reference signal transmitted from a first TRP is a QCL source of a target reference signal transmitted from a second TRP based, at least in part, on a first BW portion occupied by the source reference signal and a second BW portion occupied by the target reference signal. The first BW portion may have a first start frequency and a first BW size, and the second BW portion may have a second start frequency and a second BW size. The computer-executable instructions may also comprise one or more instructions instructing the network entity to configure a UE with the source reference signal as the QCL source of the target reference signal when it is so determined.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 7 illustrates examples of operating frequency bands for wireless communication systems, according to various aspects of the disclosure;

FIG. 8 illustrates examples of frequency overlaps between operating frequency bands, according to various aspects of the disclosure;

FIG. 9 illustrates an example information element used to provide basic parameters of a downlink carrier, according to various aspects of the disclosure;

FIG. 10 illustrates an example information element enable measurements, according to various aspects of the disclosure.

DETAILED DESCRIPTION

Figure 1:
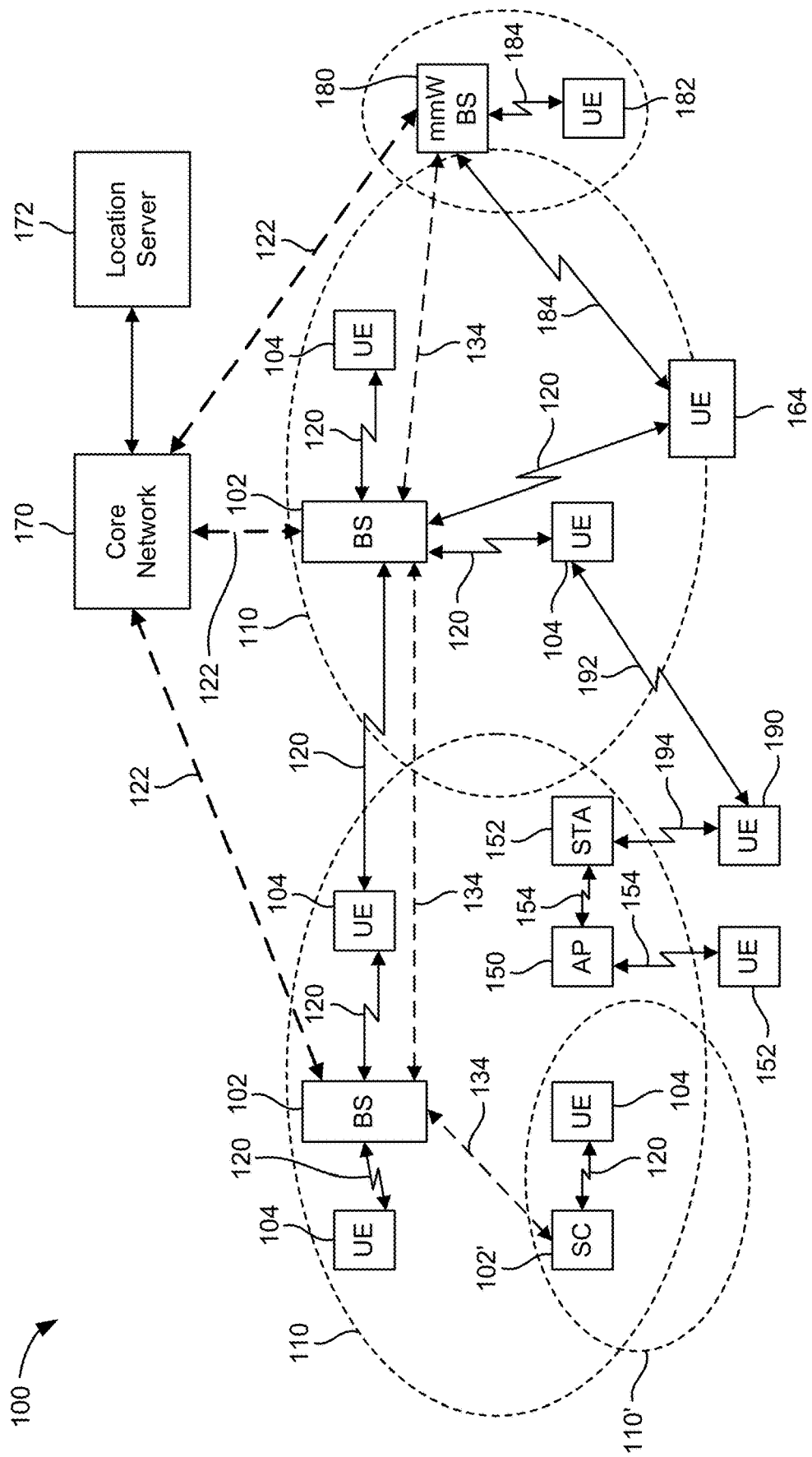
FIG. 1 illustrates an exemplary wireless communications system, according to various aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. Although FIG. 1 illustrates specific STAs 152, in an aspect, any of UEs 104 may be capable of communicating with WLAN AP 150 and may therefore be referred to as a WLAN station (STA).

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), navigation reference signals (NRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
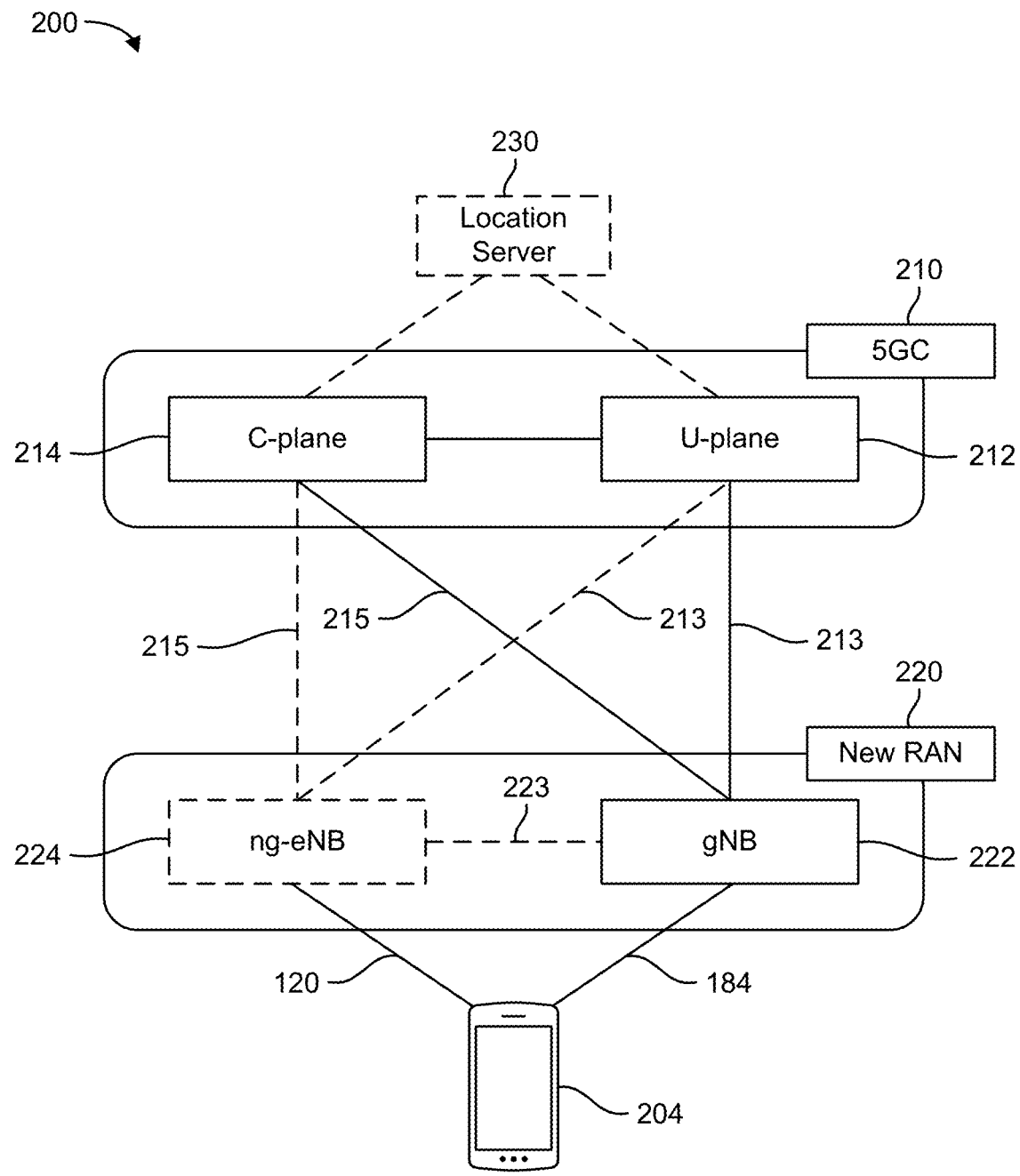
FIGS. 2A and 2B illustrate example wireless network structures, according to various aspects of the disclosure.

According to various aspects, FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
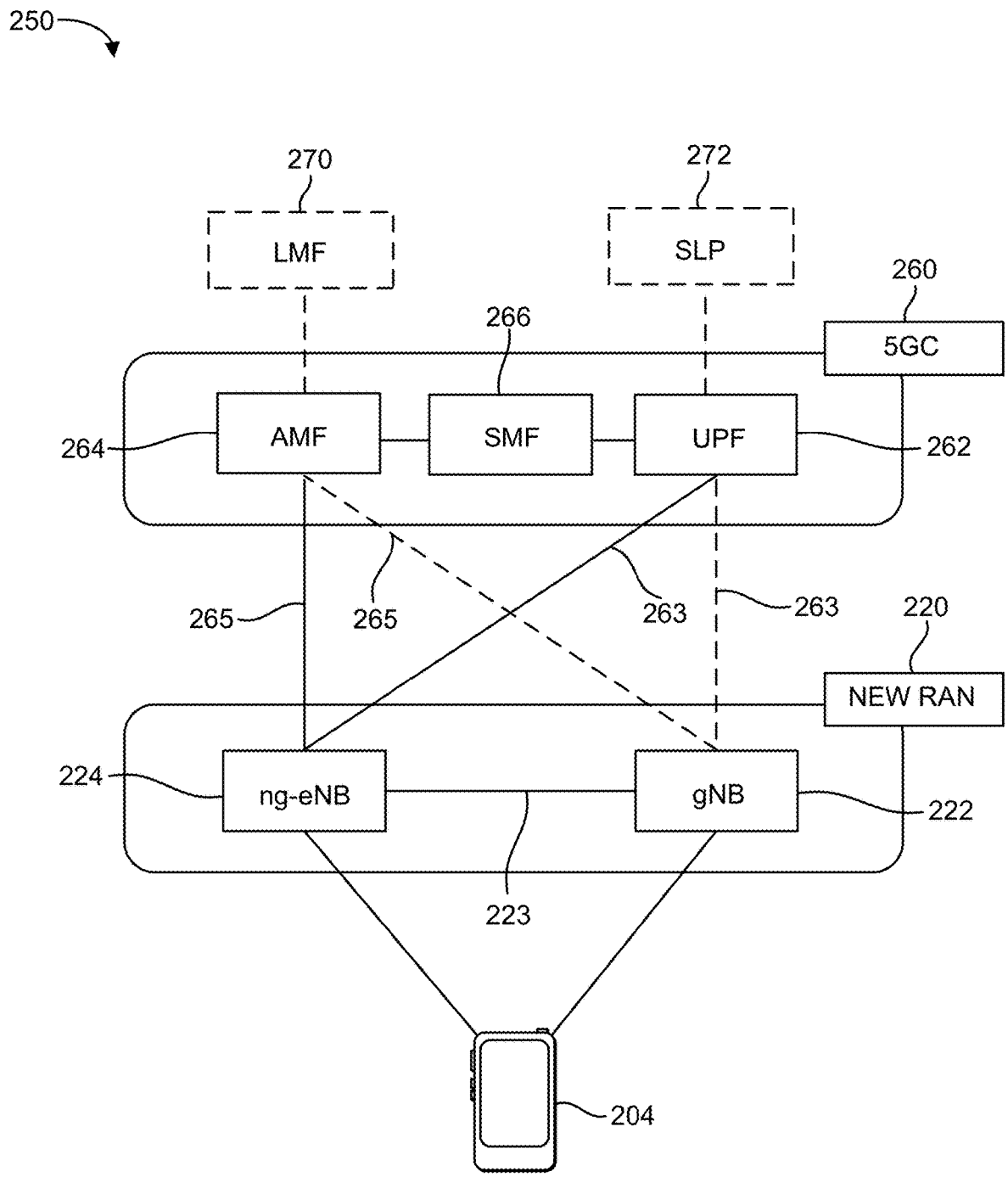

According to various aspects, FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

Figure 3A:
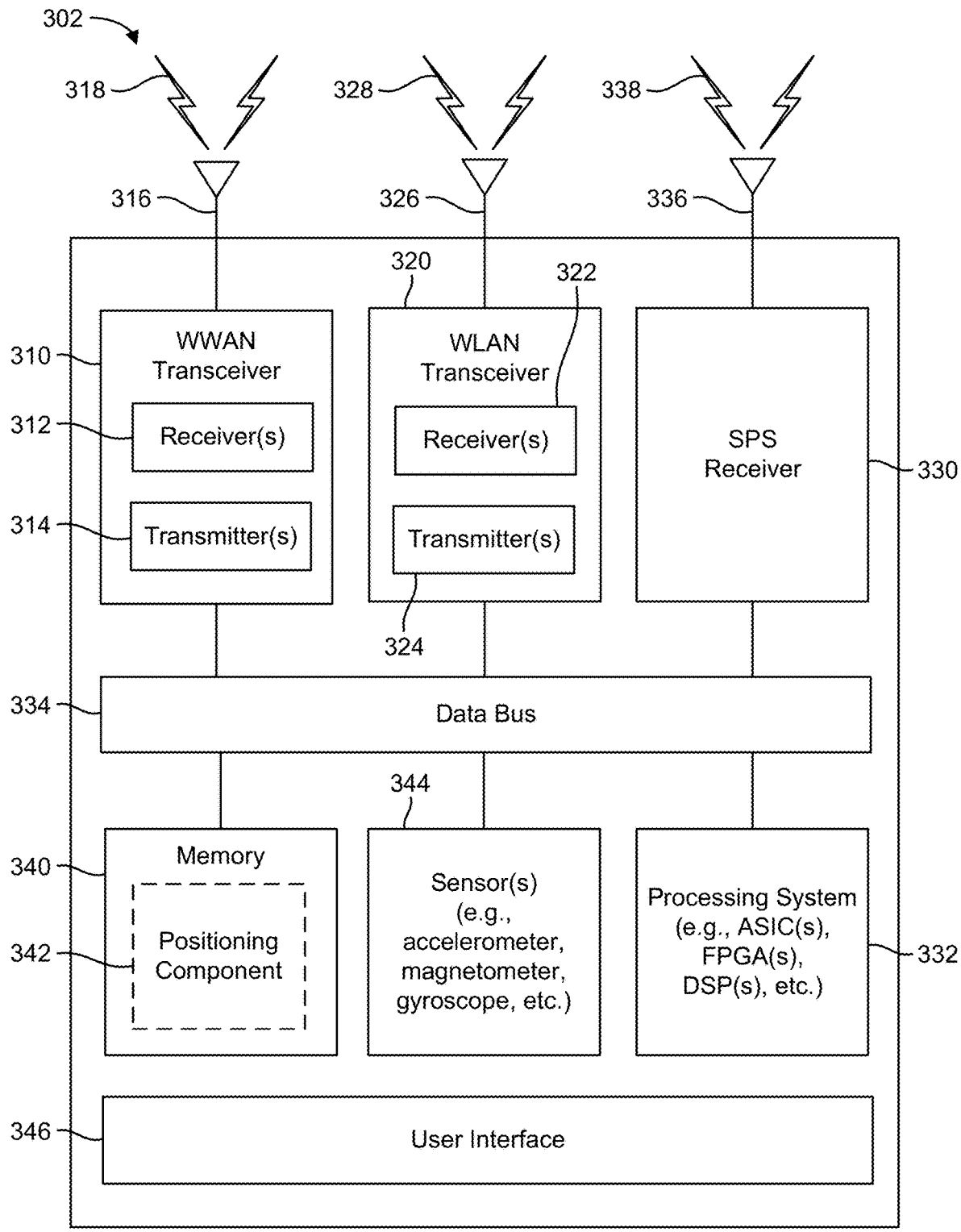
FIGS. 3A to 3C are simplified block diagrams of several sample aspects of components that may be employed in a UE, a base station, and a network entity, respectively.
Figure 3B:
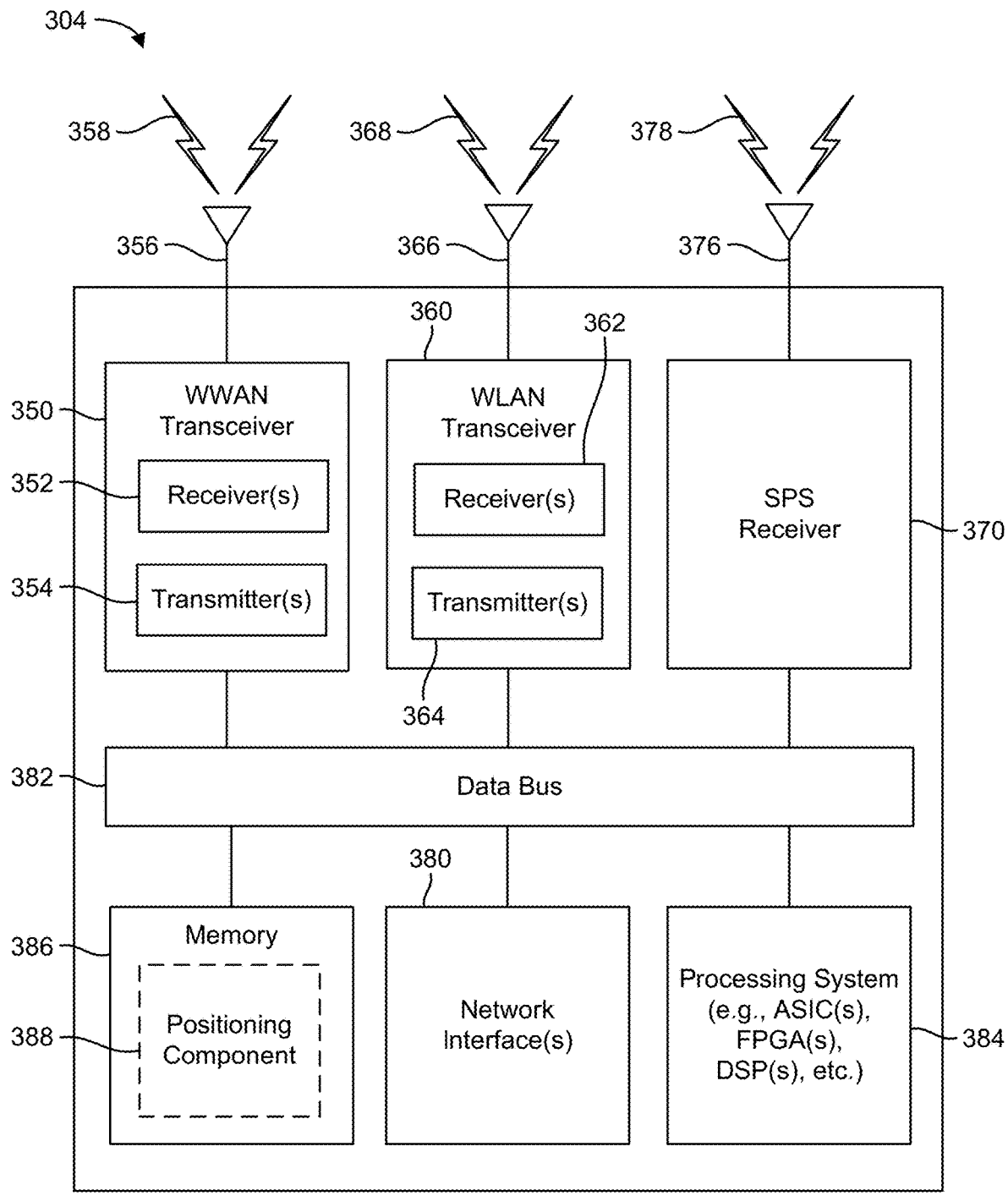
Figure 3C:
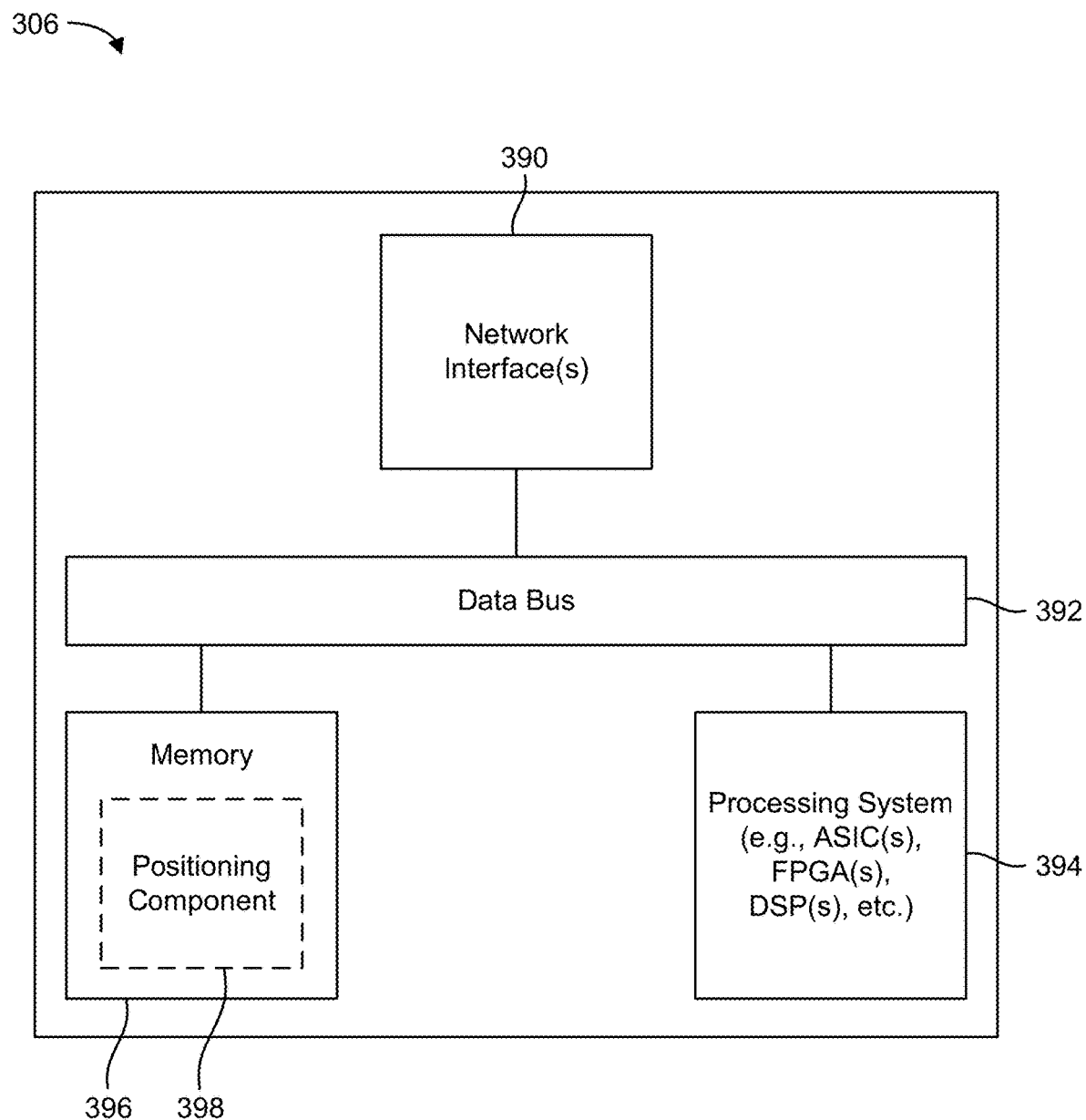

FIGS. 3A, 3B, and 3C illustrate several exemplary components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230, the LMF 270, and the SLP 272) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., ng-eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, positioning operations, and for providing other processing functionality. The base station 304 includes a processing system 384 for providing functionality relating to, for example, positioning operations as disclosed herein, and for providing other processing functionality. The network entity 306 includes a processing system 394 for providing functionality relating to, for example, positioning operations as disclosed herein, and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). In some cases, the UE 302, the base station 304, and the network entity 306 may include positioning components 342, 388, and 398, respectively. The positioning components 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the positioning components 342, 388, and 398 may be external to the processing systems 332, 384, and 394 (e.g., part of a modem processing system, integrated with another processing system, etc.). Alternatively, the positioning components 342, 388, and 398 may be memory modules (as shown in FIGS. 3A-C) stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the positioning components 342, 388, and 398, etc.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., PRS, TRS, NRS, CSI-RS, SSB, etc.) received from pairs of base stations, referred to as reference signal time difference (RSTD) or time difference of arrival (TDOA) measurements, and reports them to a positioning entity. More specifically, the UE receives the identifiers of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location. For DL-AoD positioning, a base station measures the angle and other channel properties (e.g., signal strength) of the downlink transmit beam used to communicate with a UE to estimate the location of the UE.

Uplink-based positioning methods include uplink time difference of arrival (UL-TDOA) and uplink angle-of-arrival (UL-AoA). UL-TDOA is similar to DL-TDOA, but is based on uplink reference signals (e.g., SRS) transmitted by the UE. For UL-AoA positioning, a base station measures the angle and other channel properties (e.g., gain level) of the uplink receive beam used to communicate with a UE to estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) measurement. The initiator calculates the difference between the transmission time of the RTT measurement signal and the ToA of the RTT response signal, referred to as the "Tx-Rx" measurement. The propagation time (also referred to as the "time of flight") between the initiator and the responder can be calculated from the Tx-Rx and Rx-Tx measurements. Based on the propagation time and the known speed of light, the distance between the initiator and the responder can be determined. For multi-RTT positioning, a UE performs an RTT procedure with multiple base stations to enable its location to be triangulated based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base stations.

To assist positioning operations, a location server (e.g., location server 230, LMF 270) may provide assistance data to the UE. For example, the assistance data may include identifiers of the base stations (or the cells/TRPs of the base stations) from which to measure reference signals, the reference signal configuration parameters (e.g., the number of consecutive positioning slots, periodicity of positioning slots, muting sequence, frequency hopping sequence, reference signal identifier (ID), reference signal bandwidth, slot offset, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 4A:
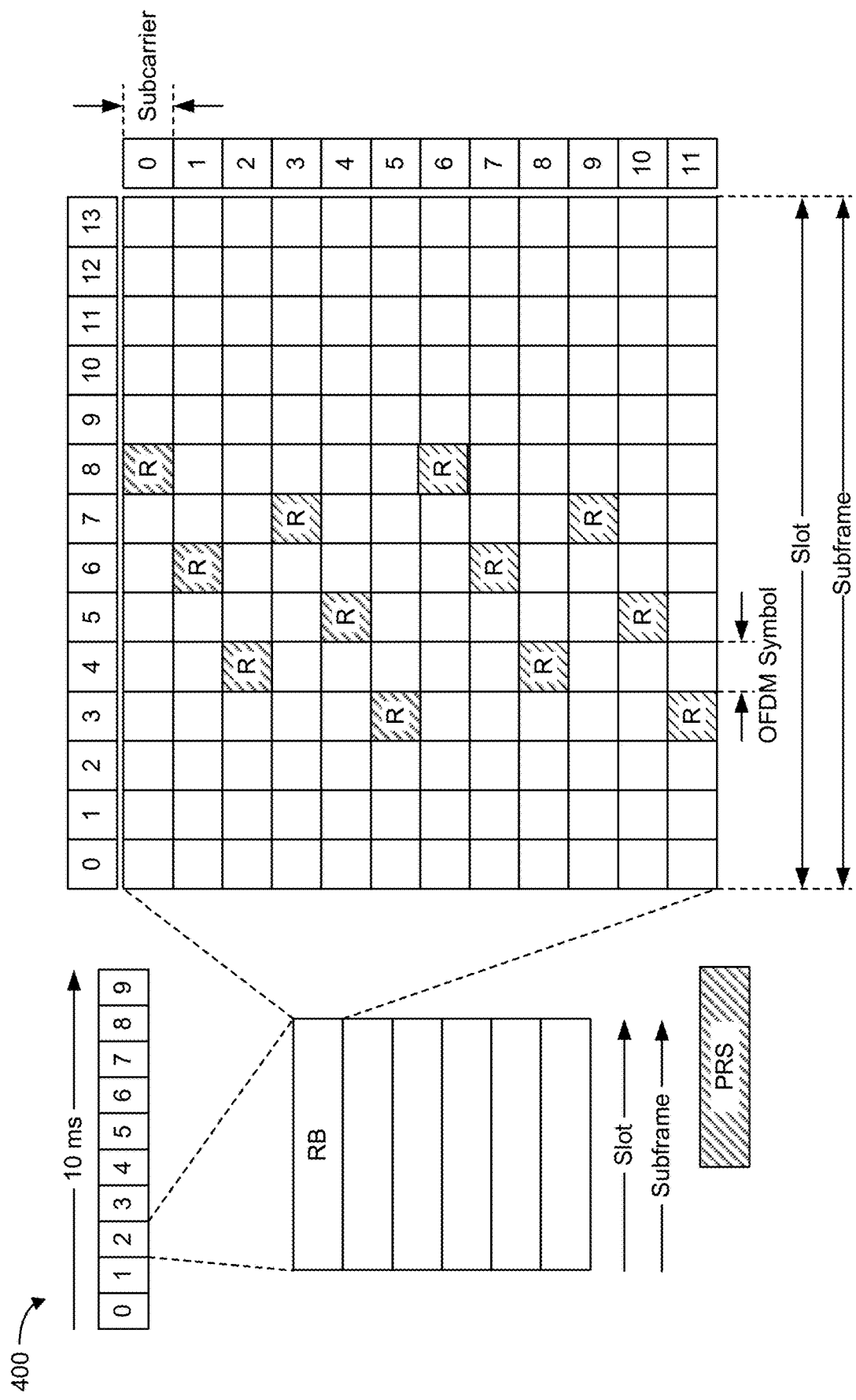
FIGS. 4A and 4B are diagrams illustrating examples of frame structures and channels within the frame structures, according to various aspects of the disclosure.
Figure 4B:
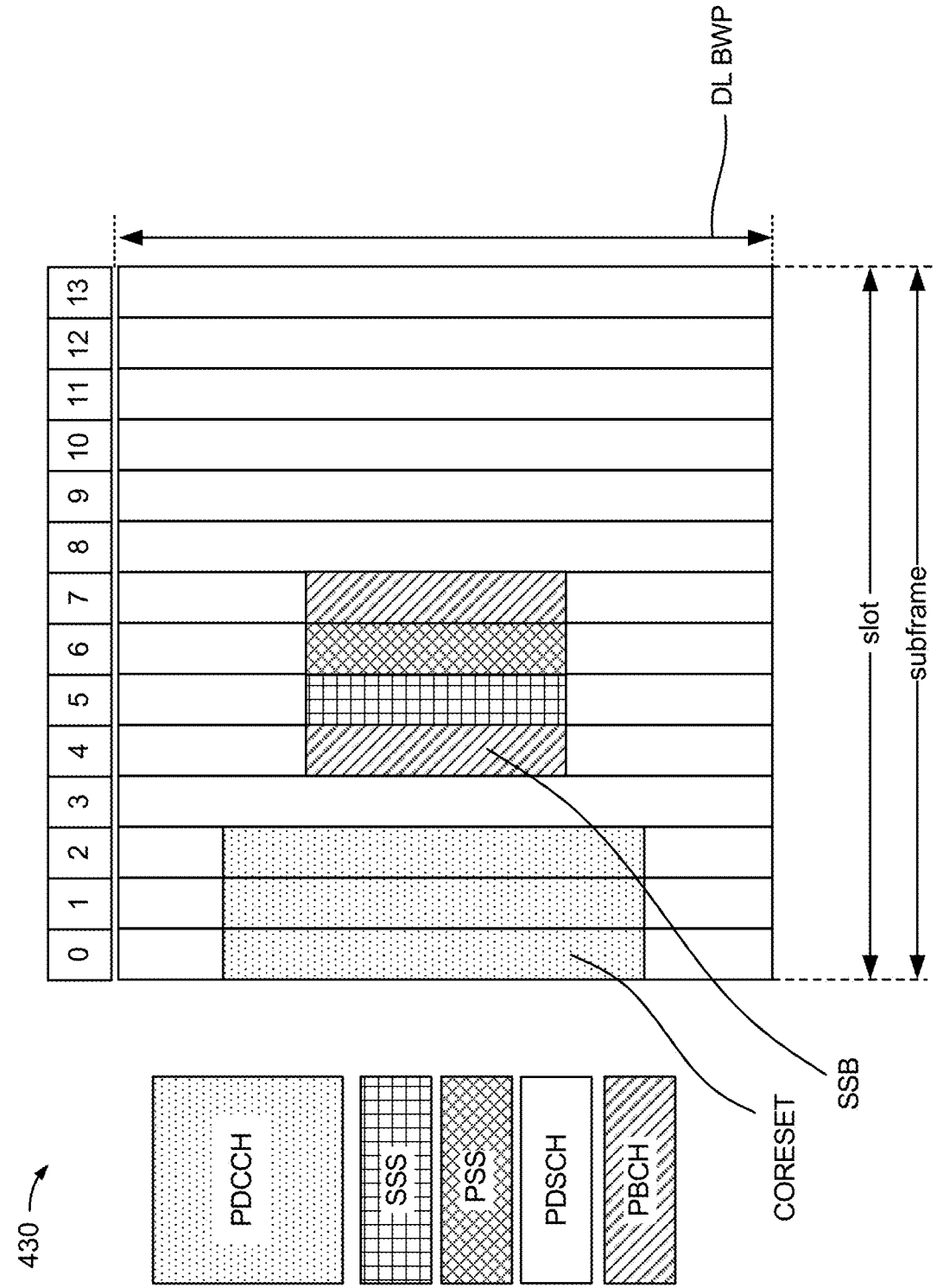

Various frame structures may be used to support downlink and uplink transmissions between network nodes (e.g., base stations and UEs). FIG. 4A is a diagram 400 illustrating an example of a downlink frame structure, according to aspects of the disclosure. FIG. 4B is a diagram 430 illustrating an example of channels within the downlink frame structure, according to aspects of the disclosure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies ($\mu$), for example, subcarrier spacing of 15 kHz, 30 kHz, 60 kHz, 120 kHz, and 240 kHz or greater may be available. Table 1 provided below lists some various parameters for different NR numerologies.

TABLE 1

| $\mu$ | SCS (kHz) | Symbols/ Sot | Slots/ Subframe | Slots/ Frame | Slot Duration (ms) | Symbol Duration ($\mu$s) | Max. nominal system BW (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

In the example of FIGS. 4A and 4B, a numerology of 15 kHz is used. Thus, in the time domain, a frame (e.g., 10 milliseconds (ms)) is divided into 10 equally sized subframes of 1 ms each, and each subframe includes one time slot. In FIGS. 4A and 4B, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4A and 4B, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs carry downlink reference (pilot) signals (DL-RS). The DL-RS may include PRS in LTE, NRS in 5G, TRS, PTRS, CRS, CSI-RS, DMRS, PSS, SSS, SSB, etc. FIG. 4A illustrates exemplary locations of REs carrying PRS (labeled "R").

A collection of resource elements (REs) that are used for transmission of PRS is referred to as a "PRS resource." The collection of resource elements can span multiple PRBs in the frequency domain and 'N' (e.g., 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each of the fours symbols of the PRS resource configuration, REs corresponding to every fourth subcarrier (e.g., subcarriers 0, 4, 8) are used to transmit PRS of the PRS resource. Currently, comb sizes of comb-2, comb-4, comb-6, and comb-12 are supported for DL-PRS. FIG. 4A illustrates an exemplary PRS resource configuration for comb-6 (which spans six symbols). That is, the locations of the shaded REs (labeled "R") indicate a comb-6 PRS resource configuration.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a cell ID). In addition, the PRS resources in a PRS resource set have the same periodicity, a common muting pattern configuration, and the same repetition factor (e.g., PRS-ResourceRepetitionFactor) across slots. The periodicity may have a length selected from $2^\mu \{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from $\{1, 2, 4, 6, 8, 16, 32\}$ slots.

A PRS resource ID in a PRS resource set is associated with a single beam (and/or beam ID) transmitted from a single TRP (where a TRP may transmit one or more beams). That is, each PRS resource of a PRS resource set may be transmitted on a different beam, and as such, a "PRS resource," or simply "resource," can also be referred to as a "beam." Note that this does not have any implications on whether the TRPs and the beams on which PRS are transmitted are known to the UE.

A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing (SCS) and cyclic prefix (CP) type (meaning all numerologies supported for the PDSCH are also supported for PRS), the same Point A, the same value of the downlink PRS bandwidth, the same start PRB (and center frequency), and the same comb-size. The Point A parameter takes the value of the parameter ARFCN-ValueNR (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

FIG. 4B illustrates an example of various channels within a downlink slot of a radio frame. In NR, the channel bandwidth, or system bandwidth, is divided into multiple bandwidth parts (BWPs). A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 4B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 4B, there is one CORESET per BWP, and the CORESET spans three symbols in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 4B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE. Multiple (e.g., up to eight) DCIs can be configured in the PDCCH, and these DCIs can have one of multiple formats. For example, there are different DCI formats for uplink scheduling, for non-MIMO downlink scheduling, for MIMO downlink scheduling, and for uplink power control. A PDCCH may be transported by 1, 2, 4, 8, or 16 CCEs in order to accommodate different DCI payload sizes or coding rates.

Note that the terms "positioning reference signal" and "PRS" may sometimes refer to specific reference signals that are used for positioning in LTE systems. However, as used herein, unless otherwise indicated, the terms "positioning reference signal" and "PRS" refer to any type of reference signal that can be used for positioning, such as but not limited to, PRS in LTE, NRS in 5G, TRS, PTRS, CRS, CSI-RS, DMRS, PSS, SSS, SSB, SRS, UL-PRS, etc. In addition, the terms "positioning reference signal" and "PRS" refer to downlink or uplink positioning reference signals, unless otherwise indicated. A downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

There are currently two alternatives for periodic PRS resource allocation. The first alternative is that the periodicity of downlink PRS resources is configured at the downlink PRS resource set level. In this case, a common period is used for downlink PRS resources within a downlink PRS resource set. The second alternative is that the periodicity of downlink PRS resources is configured at the downlink PRS resource level. In this case, different periods can be used for downlink PRS resources within a downlink PRS resource set.

Figure 5:
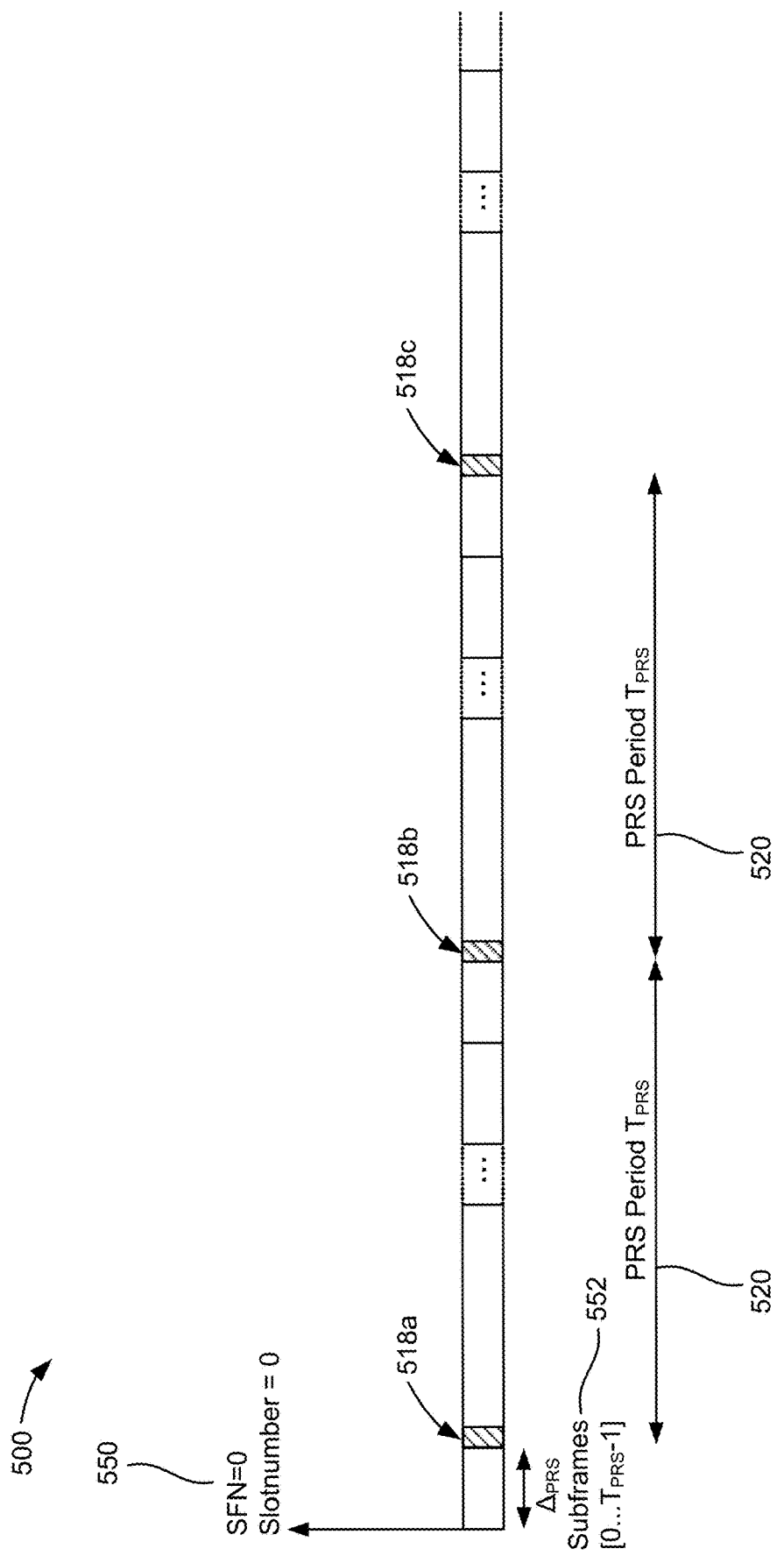
FIG. 5 is a diagram illustrating further aspects of positioning reference signal transmission for a cell supported by a wireless node.

FIG. 5 illustrates an exemplary PRS configuration 500 for a cell/TRP supported by a wireless node (e.g., a base station). FIG. 5 shows how PRS positioning occasions are determined by a system frame number (SFN), a cell-specific subframe offset ($\Delta_{PRS}$) 552, and a PRS periodicity ($T_{PRS}$) 520. Typically, the cell-specific PRS subframe configuration is defined by a PRS configuration index ($I_{PRS}$) included in positioning assistance data. The PRS periodicity ($T_{PRS}$) 520 and the cell-specific subframe offset ($\Delta_{PRS}$) are defined based on the PRS configuration index ($I_{PRS}$), as illustrated in Table 2 below.

TABLE 2

| PRS configuration Index $I_{PRS}$ | PRS periodicity $T_{PRS}$ (subframes) | PRS subframe offset $\Delta_{PRS}$ (subframes) |
| --- | --- | --- |
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-2404 | 5 | $I_{PRS}$-2400 |
| 2405-2414 | 10 | $I_{PRS}$-2405 |
| 2415-2434 | 20 | $I_{PRS}$-2415 |
| 2435-2474 | 40 | $I_{PRS}$-2435 |
| 2475-2554 | 80 | $I_{PRS}$-2475 |
| 2555-4095 | | Reserved |

A PRS configuration is defined with reference to the SFN of the cell that transmits PRS. PRS instances, for the first subframe of the $N_{PRS}$ downlink subframes comprising a first PRS positioning occasion, may satisfy:

$$(10 \times n_f + \lfloor n_s/2 \rfloor - \Delta_{PRS}) \bmod T_{PRS} = 0,$$

where $n_f$ is the SFN with $0 \leq n_f \leq 1023$, $n_s$ is the slot number within the radio frame defined by $n_f$ with $0 \leq n_s \leq 19$, $T_{PRS}$ is the PRS periodicity 520, and $\Delta_{PRS}$ is the cell-specific subframe offset 552.

As shown in FIG. 5, the cell-specific subframe offset ($\Delta_{PRS}$) 552 may be defined in terms of the number of subframes transmitted starting from SFN 0 ("Slot number=0," marked as slot 550) to the start of the first (subsequent) PRS positioning occasion. In the example in FIG. 5, the number of consecutive positioning subframes ($N_{PRS}$) in each of the consecutive PRS positioning occasions 518a, 518b, and 518c equals 4. Note that while $N_{PRS}$ may specify the number of consecutive positioning subframes per occasion, it may instead specify the number of consecutive positioning slots, based on implementation. For example, in LTE, $N_{PRS}$ specifies the number of consecutive positioning subframes per occasion, whereas in NR, $N_{PRS}$ specifies the number of consecutive positioning slots per occasion.

In some aspects, when a UE receives a PRS configuration index $I_{PRS}$ in the positioning assistance data for a particular cell, the UE may determine the PRS periodicity ($T_{PRS}$) 520 and PRS subframe offset $\Delta_{PRS}$ using Table 2. The UE may then determine the radio frame, subframe, and slot when a PRS is scheduled in the cell (e.g., using the equation above). The positioning assistance data may be determined by, for example, the location server, and include assistance data for a reference cell, and a number of neighbor cells supported by various wireless nodes.

Typically, PRS occasions from all cells in a network that use the same frequency are aligned in time and may have a fixed known time offset (e.g., cell-specific subframe offset 552) relative to other cells in the network that use a different frequency. In SFN-synchronous networks all wireless nodes (e.g., base stations) may be aligned on both frame boundary and system frame number. Therefore, in SFN-synchronous networks all cells supported by the various wireless nodes may use the same PRS configuration index $I_{PRS}$ for any particular frequency of PRS transmission. On the other hand, in SFN-asynchronous networks, the various wireless nodes may be aligned on a frame boundary, but not system frame number. Thus, in SFN-asynchronous networks, the PRS configuration index $I_{PRS}$ for each cell may be configured separately by the network so that PRS occasions align in time.

A UE may determine the timing of the PRS occasions of the reference and neighbor cells for positioning, if the UE can obtain the cell timing (e.g., SFN) of at least one of the cells, such as a reference cell or a serving cell. The timing of the other cells may then be derived by the UE based, for example, on the assumption that PRS occasions from different cells overlap.

For LTE systems, the sequence of subframes used to transmit PRS (e.g., for positioning) may be characterized and defined by a number of parameters, comprising: (i) a reserved block of bandwidth (BW), (ii) the PRS configuration index $I_{PRS}$, (iii) the duration $N_{PRS}$, (iv) an optional muting pattern, and (v) a muting sequence periodicity $T_{REP}$ that can be implicitly included as part of the muting pattern in (iv) when present. In some cases, with a fairly low PRS duty cycle, $N_{PRS}=1$, $T_{PRS}=160$ subframes (equivalent to 160 ms), and BW=1.4, 3, 5, 10, 15, or 20 MHz. To increase the PRS duty cycle, the $N_{PRS}$ value can be increased to six (i.e., $N_{PRS}=6$) and the BW value can be increased to the system bandwidth (i.e., BW=LTE system bandwidth in the case of LTE). An expanded PRS with a larger $N_{PRS}$ (e.g., greater than six) and/or a shorter $T_{PRS}$ (e.g., less than 160 ms), up to the full duty cycle (i.e., $N_{PRS}=T_{PRS}$), may also be used in later versions of the LTE positioning protocol (LPP). A directional PRS may be configured as just described, and may, for example, use a low PRS duty cycle (e.g., $N_{PRS}=1$, $T_{PRS}=160$ subframes) or a high duty cycle.

Figure 6:
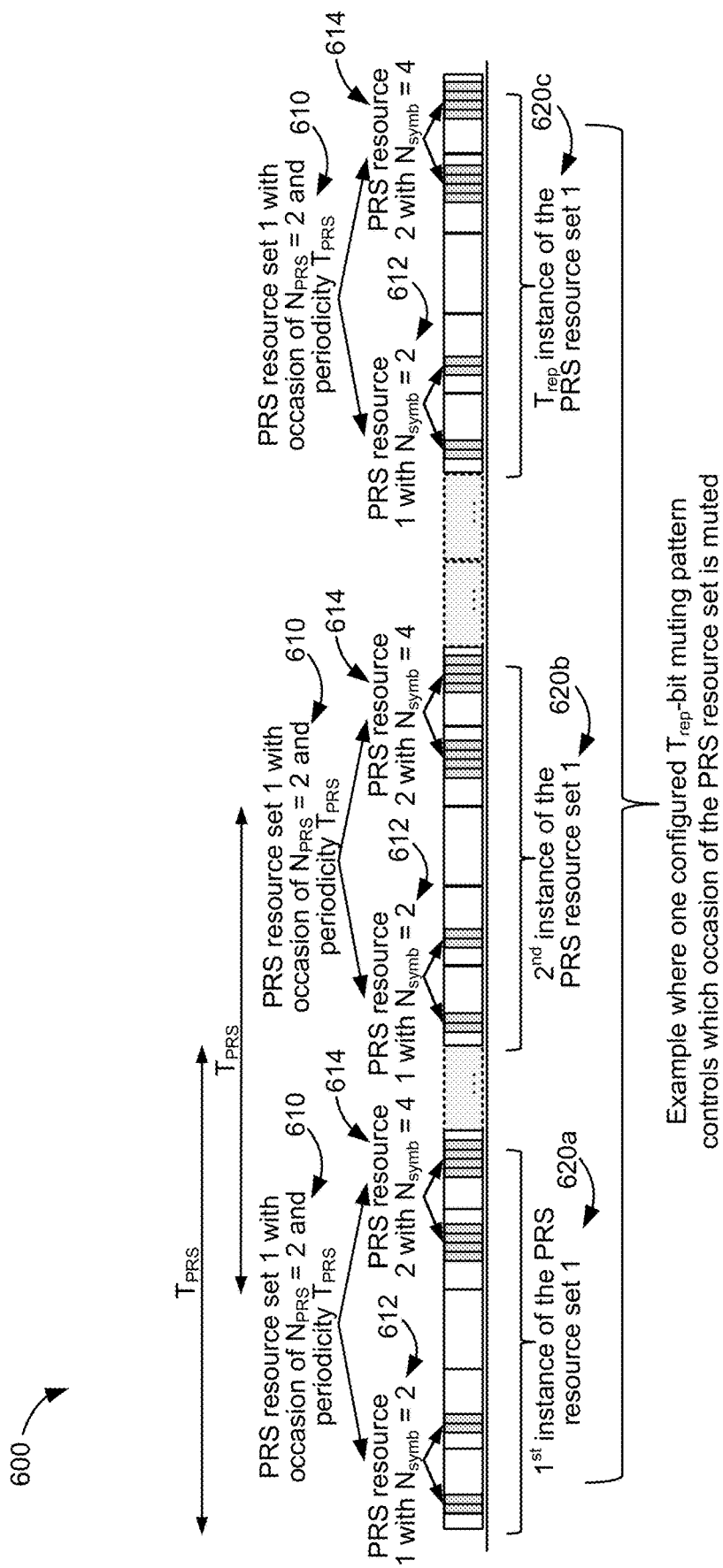
FIG. 6 is a diagram of an exemplary PRS configuration for the PRS transmissions of a given base station, according to various aspects of the disclosure.

FIG. 6 is a diagram of an exemplary PRS configuration 600 for the PRS transmissions of a given base station, according to aspects of the disclosure. In FIG. 6, time is represented horizontally, increasing from left to right. Each long rectangle represents a slot and each short (shaded) rectangle represents an OFDM symbol. The PRS configuration 600 identifies the PRS resources 612 and 614 of a PRS resource set 610 during which the base station transmits PRS. The PRS resource set 610 has an occasion length $N_{PRS}$ of two (2) slots and a periodicity of $T_{PRS}$ (e.g., 160 subframes or 160 ms). As such, both the PRS resources 612 and 614 are two consecutive slots in length and repeat every $T_{PRS}$ subframes, starting from the slot in which the first symbol of the respective PRS resource occurs.

In the example of FIG. 6, the PRS resource set 610 includes two PRS resources, a first PRS resource 612 (labeled "PRS resource 1" in FIG. 6) and a second PRS resource 614 (labeled "PRS resource 2" in FIG. 6). The PRS resource 612 and the PRS resource 614 may be transmitted on separate beams of the same base station. The PRS resource 612 has a symbol length $N_{symb}$ of two (2) symbols, and the PRS resource 614 has a symbol length $N_{symb}$ of four (4) symbols.

Each instance of the PRS resource set 610, illustrated as instances 630a, 630b, and 630c, includes an occasion of length '2' (i.e., $N_{PRS}=2$) for each PRS resource 612, 614 of the PRS resource set. The PRS resources 612 and 614 are repeated every $T_{PRS}$ subframes up to the muting sequence periodicity $T_{REP}$. As such, a bitmap of length $T_{REP}$ would be needed to indicate which occasions of instances 630a, 630b, and 630c are muted.

In an aspect, there may be additional constraints on a PRS configuration, such as PRS configuration 600 illustrated in FIG. 6. For example, for all PRS resources (e.g., PRS resources 612, 614) of a PRS resource set (e.g., PRS resource set 610), the base station can configure the following parameters to be the same: (a) the occasion length (e.g., $T_{PRS}$), (b) the number of symbols (e.g., $N_{symb}$), (c) the comb type, and/or (d) the bandwidth. In addition, for all PRS resources of all PRS resource sets, the subcarrier spacing and the cyclic prefix can be configured to be the same for one base station or for all base stations. Whether it is for one base station or all base stations may depend on the UE's capability to support the first and/or second option.

As briefly described above, in 5G, the available frequency spectrum is divided into frequency ranges "FR1" (from 450 to 6000 MHz), "FR2" (from 24250 to 52600 MHz), "FR3" (above 52600 MHz), and "FR4" (between FR1 and FR2). Within each frequency range, a number of bands (identified by respective band IDs) are defined. For example, FIG. 7 is a table 700 illustrating a few of the bands in FR1 along with their operating frequencies. In 5G, some bands may overlap (i.e., collide) in frequency, as seen in FIG. 8. FIG. 8 is a table 800 illustrating various bands in FR1 and FR2 that overlap with other bands. For example, band "n1" overlaps, at least partially, with bands "n2," "n25," and "n66."

A UE can be configured by the network (e.g., serving TRP, location server 230, LMF 270, SLP 272, etc.) with band-specific component carrier (CC) indications. For example, FIG. 9 illustrates a FrequencyInfoDL information element (IE) 900 that can be used in 5G to provide basic parameters for a downlink component carrier. The FrequencyInfoDL IE 900 includes the parameter absoluteFrequencyPointA, which provides the absolute frequency position (e.g., absolute reference frequency channel number (ARFCN)) of the reference resource block (referred to as the "Common RB 0"). Its lowest subcarrier is also known as "Point A." Note that the lower edge of the actual carrier is not defined by this field but rather in the scs-SpecificCarrierList.

The parameter absoluteFrequencySSB provides the frequency of the SSB to be used for this serving cell. SSB related parameters (e.g., SSB index) provided for a serving cell refer to this SSB frequency unless mentioned otherwise. The cell-defining SSB of the PCell is always on the sync raster. Frequencies are considered to be on the sync raster if they are also identifiable with a GSCN value. If the field is absent, the SSB related parameters should be absent (e.g., ssb-PositionInBurst, ssb-periodicityServingCell, and sub-carrierSpacing in ServingCellConfigCommon IE). If the field is absent, the UE obtains timing reference from the primary secondary cell (SpCell). This is only supported in case the Scell is in the same frequency band as the SpCell.

The parameter frequencyBandList is a list of only one frequency band to which the particular component carrier(s) belong(s). Multiple values are not supported.

FIG. 10 illustrates a MeasObjectNR IE 1000 to enable RRM measurements in 5G NR. The MeasObjectNR IE 1000 includes the parameter freqBandIndicatorNR, which indicates the frequency band in which the SSB and/or the CSI-RS in the MeasObjectNR are located and according to which the UE is to perform the RRM measurements. This field should always be provided when the network configures measurements with an MeasObjectNR IE. The parameter refFreqCSI-RS specifies the Point A that is used for mapping the CSI-RS to physical resources.

As described above with reference to FIG. 1, certain transmitters (e.g., TRPs of base stations or UEs), especially those capable of 5G NR communication, may use beamforming to send and receive information over a wireless channel. As also discussed above, transmit beams may be quasi-collocated, meaning that two or more transmit beams appear to the receiver as having the same parameters, regardless of whether or not the transmitting antennas themselves are physically collocated.

In 5G NR, there may be QCL relations beyond QCL Type D (i.e., the receiver can use the source reference signal to estimate the spatial receive parameters of the reference signal transmitted on the same channel) for a DL-PRS resource. Specifically, one or more of the following options may be supported: (1) QCL Type C using an SSB from a TRP, (2) QCL Type C using a DL-PRS resource from a TRP, (3) QCL Type A using a DL-PRS resource from a TRP, (4) QCL Type C using a CSI-RS resource from a TRP, (5) QCL Type A using a CSI-RS resource from a TRP, or (6) no QCL relation beyond QCL Type D is supported. That is, for example, if option (1) is supported, then the receiver (e.g., a UE) can use an SSB from the transmitter (e.g., a TRP) to estimate the Doppler shift and average delay of a second reference signal (e.g., DL-PRS) transmitted on the same channel. Similarly, if option (3) is supported, then the receiver (e.g., a UE) can use a DL-PRS from the transmitter (e.g., a TRP) to estimate the Doppler shift, Doppler spread, average delay, and delay spread of a second reference signal (e.g., DL-PRS) transmitted on the same channel.

For positioning purposes, it would be desirable to be able to use a source reference signal to derive large scale statistics for a PRS (i.e., the target reference signal). For this to be valid, the source reference signal and the PRS should experience the same, or at least similar, wireless channel conditions. For example, the two reference signals should be on the same or similar frequency. Also, the TRPs of the source reference signal and the PRS should be the same or very near each other. However, a PRS resource is band-agnostic, and at the same time, its bandwidth may belong to multiple bands if it falls within a region with band overlap (e.g., as illustrated in FIG. 8). In other words, the bandwidth of the PRS need not belong to any specific band. For example, the bandwidth of the PRS may span any number of defined bands and/or may be in overlap regions of multiple bands.

One reason for PRS to be band agnostic is that positioning accuracy increases as the bandwidth increases. Thus, if a PRS' bandwidth is band-specific (i.e., tied to a specific band), then the positioning accuracy can become limited. By making a PRS band-agnostic, the bandwidth of the PRS can be adjusted to achieve the desired positioning accuracy.

Of course, it is contemplated that in some circumstances, a relatively narrow bandwidth may be sufficient to achieve the desired positioning accuracy such that a PRS is entirely within a single band. But even in these circumstances, the band agnostic approach may still be used to specify the PRS.

Figure 11:
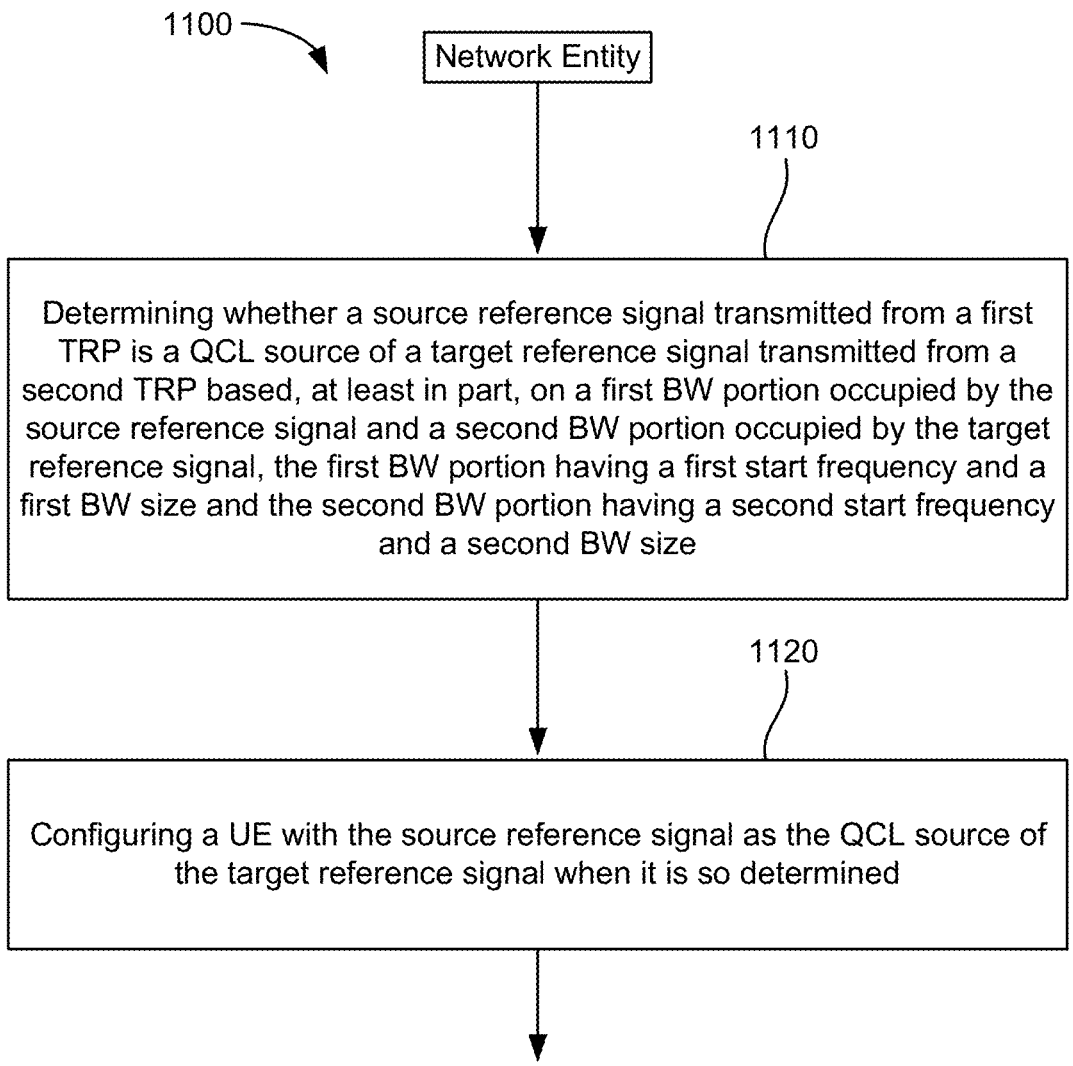
FIGS. 11-14 illustrate example flow charts of methods and/or processes, according to various aspects of the disclosure.

FIG. 11 illustrates an example method 1100 performed by a network entity, such as a network node (e.g., a serving TRP) or a core network component (e.g., location server 230, LMF 270, SLP 272) to inform a UE of QCL relationships between two reference signals.

In block 1110, the network entity determines whether a source reference signal transmitted from a first TRP is a QCL source for a target reference signal transmitted from a second TRP (the same or different as the first TRP). The determination may be based, at least in part, on a first BW portion occupied by the source reference signal and a second BW portion occupied by the target reference signal. The first BW portion may be characterized with a first start frequency, a first BW size, and/or a first end frequency. The second BW portion may be characterized with a second start frequency, a second BW size, and/or a second end frequency.

Note that two of these characterizations are sufficient. For example, if the first start frequency and BW sizes are specified, then the first end frequency may be calculated as a sum of the first start frequency and the first BW size. As an illustration, the first start frequency may be indicated as 2496 MHz and the first BW size may be indicated as 194 MHz, meaning that the example first BW portion would span between 2496 MHz (the first start frequency) and 2690 MHz (the first end frequency=first start frequency+first BW size).

Also note that unless explicitly indicated otherwise, the terms "frequency" and "bandwidth" should be interpreted broadly to encompass concepts that may be used as proxies to frequency. Such proxies may include physical resource blocks (PRBs), channel numbers (e.g., ARFCN), and so on. For example, the first start frequency may be equated to a first start PRB, and the first BW size may be equated to a first number of PRBs.

In an aspect, the source reference signal may be a downlink reference signal, such as first DL-PRS, an SSB, a CSI-RS, etc. The target reference signal may be a downlink positioning reference signal, such as a second DL-PRS different from the first DL-PRS (where the source reference signal is a first DL-PRS). Note that a CSI-RS resource may be a QCL Type A source (i.e., Doppler shift, Doppler spread, average delay, and delay spread) of a PRS resource only if the BW of the CC of the BWP where the CSI-RS resource belongs has a constraint with respect to the BW of the PRS. In this case, the BW portions may be the same as described above, that is, may include the center BW, the start frequency, the BW size, and/or the end frequency, or some other non-zero overlap between the BW portions of the CSI-RS resources and the PRS resources.

The source reference signal may be band agnostic or band specific. In some cases, the source reference signal may be component carrier specific. On the other hand, the target reference signal can be band agnostic. In other words, the target reference signal is allowed to span, or at least partially overlap, multiple bands, such as the bands already specified in 5G NR (see e.g., FIGS. 7 and 8).

Where the network entity is a base station, block 1110 may be performed by WWAN transceiver 350, network interface(s) 380, processing system 384, memory component 386, and/or positioning component 388, any or all of which may be considered means for performing this operation. Where the network entity is a core network component, block 1110 may be performed by network interface(s) 390, processing system 394, memory component 396, and/or positioning component 398, any or all of which may be considered means for performing this operation.

Figure 12:
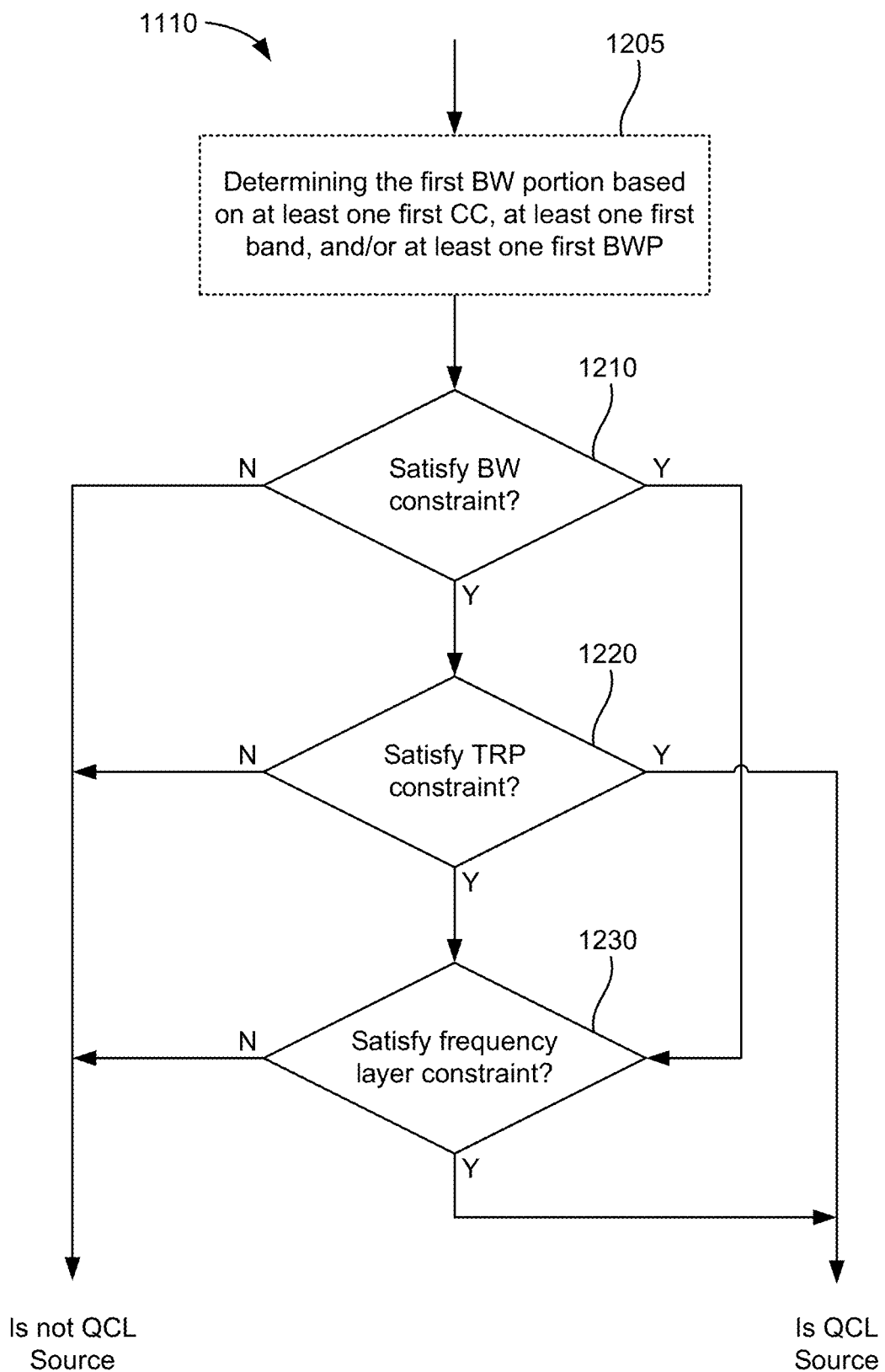

FIG. 12 is a flow chart of an example process performed by the network entity to implement block 1110 of FIG. 11. In block 1210, the network entity determines whether or not the source and target reference signals satisfy a BW constraint. In an aspect, the BW constraint may be satisfied when the first and second BW portions are within a threshold distance of each other in the frequency domain. For example, the threshold distance may be a threshold frequency distance specified in some number of Hertz (Hz) (e.g., 20 MHz). Again, however, the "frequency" may be interpreted to include proxy characteristics. That is, the threshold distance may be specified as a threshold PRB distance (e.g., specifying a number of PRBs), a threshold band distance (e.g., specifying a number of bands), a threshold channel distance (e.g., specifying a number of channels), etc.

The threshold distance may be frequency range (FR) specific. For example, in FR1, the threshold distance (e.g., threshold frequency distance) may be 20 MHz or less (e.g., 10 MHz, 5 MHz, etc.). In FR2, the threshold distance may be 100 MHz or less (e.g., 50 MHz, 20 MHz, etc.). Generally, the higher the operating frequencies, the larger the threshold distance may be. The threshold distance may correlate to bandwidths of bands of the particular frequency range. Thus, in some aspects, the threshold distance for FR1 may be smaller than the threshold distance for FR2.

An example of the threshold distance may be a threshold center distance. In this instance, the BW constraint may be satisfied when a first BW center and a second BW center are within a threshold center distance of each other. The first BW center may be the center of the first BW portion and the second BW center may be the center of the second BW portion. Note that the BW constraint can be made stricter by setting the threshold center distance to be smaller. If the threshold center distance is set to zero, this means that the BW constraint is satisfied when the first and second BW centers are the same, that is, aligned.

Another example of the threshold distance may be a threshold start distance. In this instance, the BW constraint may be satisfied when the first and second start frequencies are within the threshold start distance of each other. The BW constraint can be made stricter by setting the threshold start distance to be smaller. If the threshold start distance is set to zero, this means that the BW constraint is satisfied when the first and second start frequencies are the same, that is, aligned.

A further example of the threshold distance may be a threshold end distance. In this instance, the BW constraint may be satisfied when the first and second end frequencies are within the threshold end distance of each other. Recall that the first (second) end frequency may be calculated as a sum of the first (second) start frequency and the first (second) BW size. The BW constraint can be made stricter by setting the threshold end distance to be smaller. If the threshold end distance is set to zero, this means that the BW constraint is satisfied when the first and second end frequencies are the same, that is, aligned.

The network entity may determine that the BW constraint is satisfied whenever there is a non-zero overlap between the first and second BW portions. More generally, the network entity may determine that the BW constraint is satisfied when any part of the first BW portion is within the threshold distance of any part of the second BW portion.

As noted above, the source reference signal may be band agnostic or band specific, and even CC specific. If the source reference signal is band agnostic (e.g., a first DL-PRS), then the first start frequency, the first BW size, and/or the first end frequency may be specified or otherwise configured. However, if the source reference signal (e.g., a CSI-RS, SSB, etc.) is band and/or CC specific, then its characteristics may be configured through a frequency domain container that specifies at least one first CC, at least one first band (i.e., one or more first bands), and/or at least one first BWP of the source reference signal.

In this instance, in block 1205 (prior to block 1210), the network entity may determine the first BW portion based on the at least one first CC, the at least one first band, and/or the at least one first BWP. In 5G, the CCs are generally contained within bands, which are generally contained within BWPs. Thus, in an aspect, the at least one first BWP (whether configured directly or determined from the at least one first CC and/or the at least one first band) may be used as the first BW portion. In another aspect, the at least one first band (whether configured directly or determined from the at least one first CC) may be used as the first BW portion. In yet another aspect, the at least one first CC itself may be used as the first BW portion.

In FIG. 12, block 1205 is dashed to indicate that it is optional. Block 1205 is optional in that it may be performed if the source reference signal is not configured to directly specify the first BW portion, that is, the source reference signal is configured to specify the at least one first CC, the at least one first band, and/or the at least one first BWP. However, in an aspect, block 1205 need not be performed even when the source reference signal is CC and/or band specific, that is, is configured to specify the at least one first CC, the at least one first band, and/or the at least one first BWP.

Figure 13:
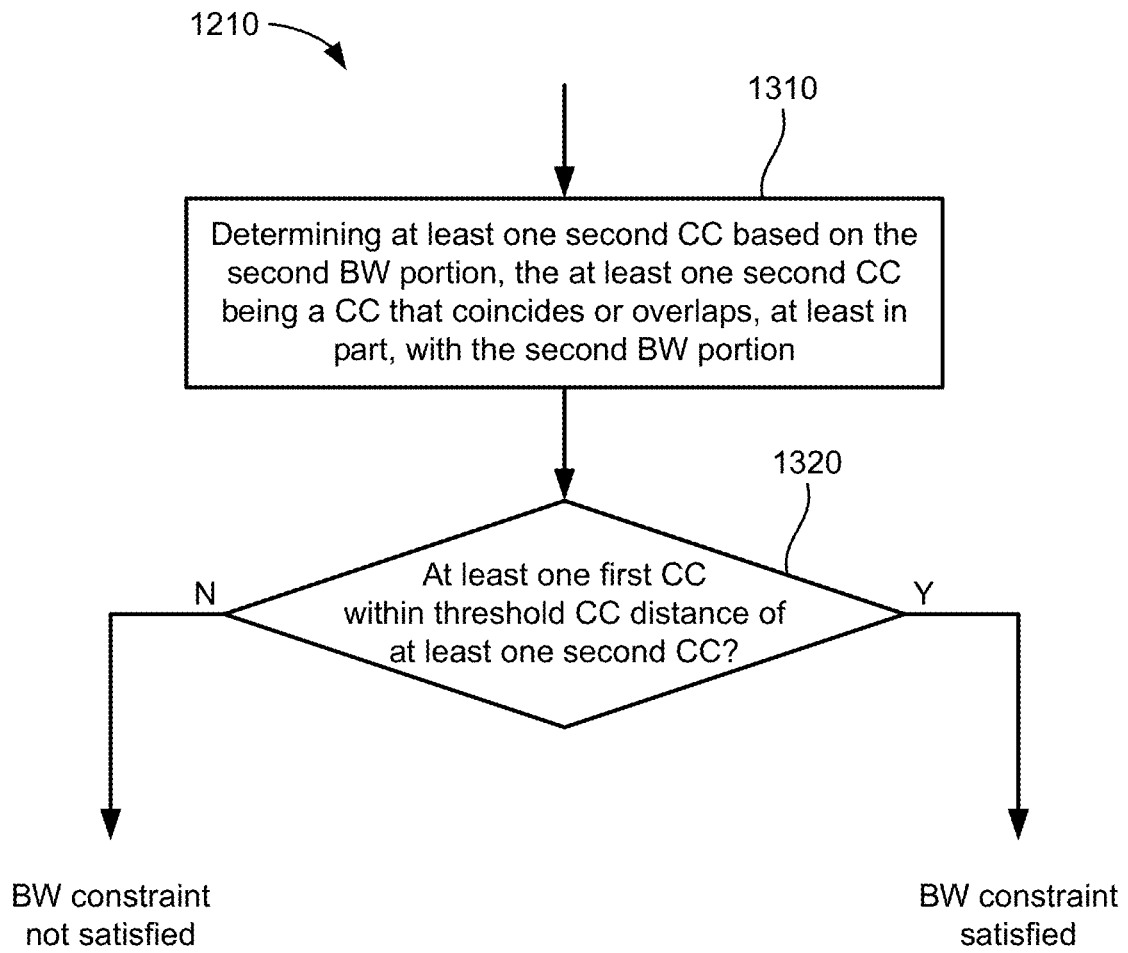

FIG. 13 is a flow chart of an example process performed by the network entity to implement block 1210 when the source reference signal is configured to specify the at least one first CC. In block 1310, the network entity may determine at least one second CC based on the second BW portion. Generally, the network entity may determine one or more CCs that make up the second BW portion, that is, determine the CCs that coincide or overlap (at least partially) with the second BW portion.

In block 1320, the network entity may determine that the BW constraint is satisfied when the at least one first CC and the at least one second CC are within a threshold CC distance of each other. Otherwise, the network entity may determine that the BW constraint is not satisfied. If the threshold CC distance is set to zero, this implies that the BW constraint is satisfied when the at least first CC and the at least one second CC are the same.

Figure 14:
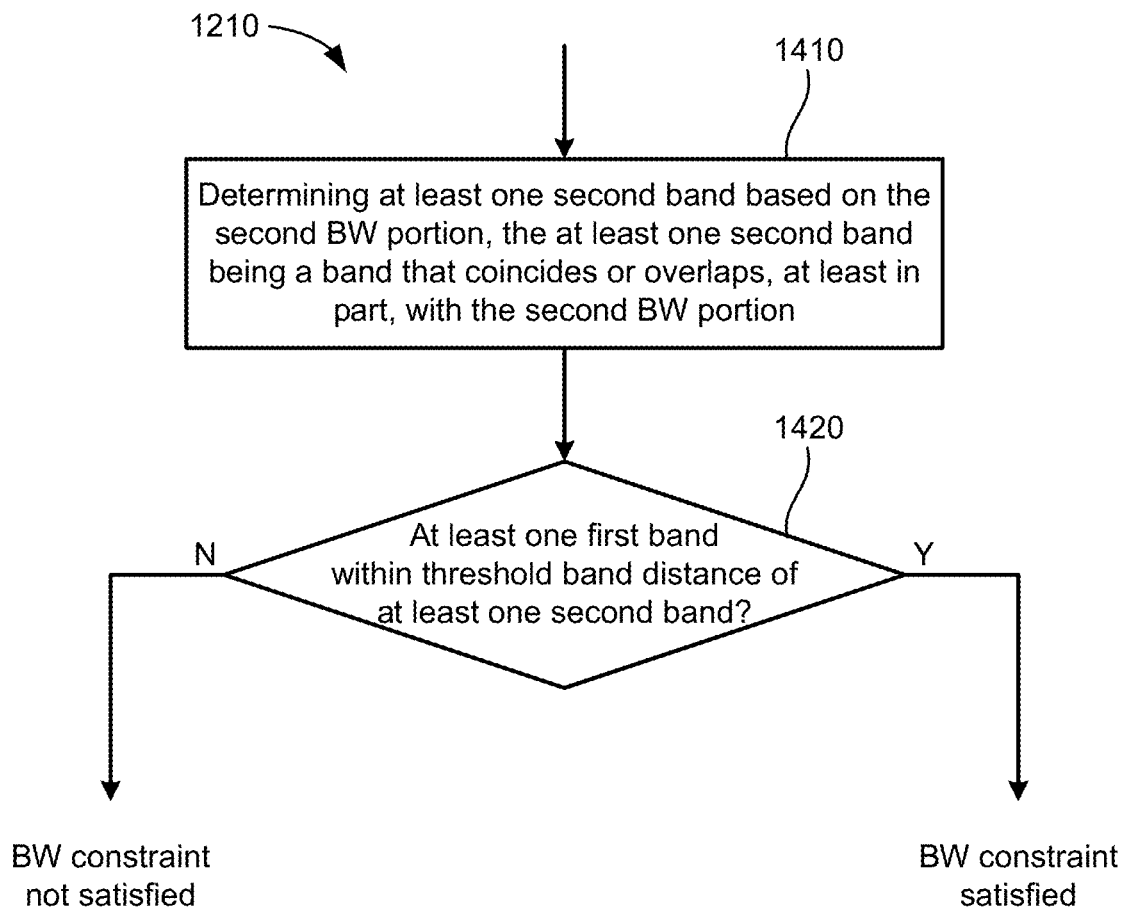

FIG. 14 is a flow chart of an example process performed by the network entity to implement block 1210 when the source reference signal is configured to specify the at least one first band. In block 1410, the network entity may determine at least one second band (i.e., one or more second bands) based on the second BW portion. Generally, the network entity may determine one or more bands that make up the second BW portion to determine the bands that coincide or overlap (at least partially) with the first BW portion.

In block 1420, the network entity may determine that the BW constraint is satisfied when the at least one first band and the at least one second band are within a threshold band distance of each other. Otherwise, the network may determine that the BW constraint is not satisfied. If the threshold band distance is set to zero, this implies that the BW constraint is satisfied when the at least one first band and the at least one second band are the same. Alternatively, the threshold band distance may specify the minimum number of overlapping bands between the at least one first band and the at least one second band. That is, the threshold band distance may specify the minimum number of bands that the at least one first band and the at least one second band should have in common.

While not illustrated, note that the source reference signal may be configured to specify the at least one first BWP. In such instances, the network entity may simply treat the at least one first BWP as the first BW portion and proceed accordingly as described previously.

Referring back to FIG. 12, if the network entity determines that the BW constraint is not satisfied ("N" branch from block 1210), then the network entity may determine that the source reference signal is not a QCL source for the target reference signal. On the other hand, if the BW constraint is satisfied, then the network entity may proceed to block 1220 (to determine if a TRP constraint is satisfied) or to block 1230 (to determine if a frequency layer constraint is satisfied). In other words, satisfying the BW constraint may be a necessary condition, but not necessarily a sufficient condition. In addition to satisfying the BW constraint, the source and target reference signals may need to satisfy the TRP constraint and/or the frequency layer constraint.

If the network entity proceeds to block 1220, the network entity may determine if the TRP constraint is satisfied. For example, the TRP constraint may specify a maximum allowable separation distance between first and second TRPs. If a strict condition is desired, the TRP constraint may be set such that the TRP constraint is satisfied when the first and second TRPs are the same, that is, the source and target reference signals are transmitted from the same TRP. If a less strict condition is desired, the TRP constraint may be set such that the TRP constraint is satisfied when the first and second TRPs are TRPs of the same base station, that is, the source and target reference signals are transmitted from different TRPs of the same base station. If an even less strict condition is desired, the TRP constraint may be set such that the TRP constraint is satisfied when the first and second TRPs are associated with different base stations within some threshold distance of each other. Otherwise, the TRP constraint may not be satisfied, in which case, the network entity may determine that the source reference signal is not a QCL source for the target reference signal ("N" branch from block 1220).

In one aspect, the network entity may determine that the source reference signal is a QCL source for the target reference if the TRP constraint is satisfied (right "Y" branch from block 1220). In another aspect, the network entity may proceed to block 1230 (lower "Y" branch from block 1220).

If the network entity proceeds to block 1230, the network entity may determine if the frequency layer constraint is satisfied. For example, the frequency layer constraint may be set such that the frequency layer constraint is satisfied when the first and second frequencies are the same. Otherwise, the frequency layer constraint may not be satisfied, in which case, the network entity may determine that the source reference signal is not a QCL source for the target reference signal ("N" branch from block 1230). The network entity may determine that the source reference signal is a QCL source for the target reference if the frequency layer constraint is satisfied ("Y" branch from block 1230).

Referring back to FIG. 11, in block 1120, the network entity configures a UE (e.g., any of the UEs described herein) with the source reference signal as the QCL source of the target reference signal when it is so determined. The UE, armed with such information, may take measurements of the source reference signal (e.g., average delay, delay spread, etc.). Then when the UE receives the target reference signal, it can make positioning related measurements (e.g., ToA) of the target reference signal based on the measurements made of the source reference signal.

Where the network entity is a base station, block 1120 may be performed by WWAN transceiver 350, network interface(s) 380, processing system 384, memory component 386, and/or positioning component 388, any or all of which may be considered means for performing this operation. Where the network entity is a core network component, block 1120 may be performed by network interface(s) 390, processing system 394, memory component 396, and/or positioning component 398, any or all of which may be considered means for performing this operation.

As will be appreciated, a technical advantage of the methods and techniques disclosed herein is to enable a network entity (e.g., a location server) to determine whether or not one reference signal (e.g., CSI-RS, DL-PRS, SSB, etc.) received at a UE can be a QCL source (i.e., provide a QCL relation) for another reference signal (e.g., CSI-RS, DL-PRS, SSB, etc.) received at or transmitted by the UE.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A network entity, comprising:
at least one transceiver;
a memory; and
at least one processor communicatively coupled to the at least one transceiver and the memory,
wherein the at least one processor is configured to:
determine whether a source reference signal transmitted from a first transmission-reception point (TRP) is a quasi-collocation (QCL) source of a target reference signal transmitted from a second TRP based, at least in part, on a first bandwidth (BW) portion occupied by the source reference signal and a second BW portion occupied by the target reference signal, the first BW portion having a first start frequency and a first BW size and the second BW portion having a second start frequency and a second BW size, wherein the source reference signal is a first downlink positioning reference signal transmitted on a first downlink transmit beam and the target reference signal is a second downlink positioning reference signal transmitted on a second downlink transmit beam, and wherein it is determined that the source reference signal is the QCL source of the target reference signal based on the source reference signal and the target reference signal satisfying a BW constraint specifying that a first BW portion and the second BW portion be within a threshold distance of each other in a frequency domain; and
configure a user equipment (UE) with the source reference signal as the QCL source of the target reference signal based on a determination that the source reference signal is the QCL source of the target reference signal.

2. The network entity of claim 1, wherein the network entity is one of a location server, a location management function, or a serving TRP.

3. The network entity of claim 1, wherein, based on a determination that the source reference signal is the QCL source of the target reference signal, the source reference signal is the QCL source with respect to Doppler shift, Doppler spread, average delay, delay spread, spatial receive parameter, or any combination thereof.

4. The network entity of claim 1, wherein:
the source reference signal and the target reference signal are downlink positioning reference signals (DL-PRS).

5. The network entity of claim 1, wherein:
the at least one processor is configured to determine that the source reference signal is the QCL source of the target reference signal based on the source reference signal and the target reference signal satisfying the BW constraint and satisfy a TRP constraint, and
the TRP constraint specifies that the first TRP is the same as the second TRP.

6. The network entity of claim 1, wherein:
the at least one processor is configured to determine that the source reference signal is the QCL source of the target reference signal based on the source reference signal and the target reference signal satisfying the BW constraint and satisfy a frequency layer constraint, and
the frequency layer constraint specifies that a first frequency layer is the same as a second frequency layer, the first frequency layer being a frequency layer of the source reference signal, and the second frequency layer being a frequency layer of the target reference signal.

7. The network entity of claim 1, wherein:
the threshold distance is specified as a threshold physical resource block (PRB) distance, a threshold frequency distance, a threshold band distance, a threshold channel distance, or any combination thereof, the threshold PRB distance specifies a number of PRBs,
the threshold frequency distance specifies a number of Hertz (Hz),
the threshold band distance specifies a number of bands, and
the threshold channel distance specifies a number of channels.

8. The network entity of claim 1, wherein the threshold distance is frequency range (FR) specific.

9. The network entity of claim 8, wherein the threshold distance is less than or equal to 20 MHz for FR1 and less than or equal to 100 MHz for FR2.

10. The network entity of claim 1, wherein:
the threshold distance specifies a threshold center distance, and
the at least one processor is configured to determine that the BW constraint is satisfied based on a first BW center and a second BW center being within the threshold center distance of each other, the first BW center being a center of the first BW portion and the second BW center being a center of the second BW portion.

11. The network entity of claim 10, wherein the threshold center distance is zero such that the BW constraint is satisfied based on the first BW center and the second BW center being the same.

12. The network entity of claim 1, wherein:
the threshold distance specifies a threshold start distance, and
the at least one processor is configured to determine that the BW constraint is satisfied based on the first start frequency and the second start frequency being within the threshold start distance of each other.

13. The network entity of claim 12, wherein threshold start distance is zero such that the BW constraint is satisfied based on the first start frequency and the second start frequency being the same.

14. The network entity of claim 1, wherein:
the threshold distance specifies a threshold end distance, and
the at least one processor is configured to determine that the BW constraint is satisfied based on a first end frequency and a second end frequency being within the threshold end distance of each other, the first end frequency being equal to a sum of the first start frequency and the first BW size, and the second end frequency being equal to a sum of the second start frequency and the second BW size.

15. The network entity of claim 14, wherein threshold end distance is zero such that the BW constraint is satisfied based on the first end frequency and the second end frequency are the same.

16. The network entity of claim 1, wherein the at least one processor is configured to determine that the BW constraint is satisfied based on any part of the first BW portion being within the threshold distance of any part of the second BW portion.

17. The network entity of claim 1, wherein the at least one processor is configured to determine that the BW constraint is satisfied based on there being a non-zero overlap between the first BW portion and the second BW portion.

18. The network entity of claim 1, wherein:
the source reference signal is configured through a frequency domain container specifying at least one first component carrier (CC), at least one first band, and/or at least one first bandwidth part (BWP) of the source reference signal, and
the at least one processor is configured to:
determine the first BW portion based on the at least one first CC, the at least one first band, and/or the at least one first BWP prior to determining whether the BW constraint is satisfied.

19. The network entity of claim 1, wherein:
the threshold distance specifies a threshold component carrier (CC) distance,
the source reference signal is configured through a frequency domain container specifying at least one first CC of the source reference signal, and
the at least one processor is configured to:
determine at least one second CC based on the second BW portion, the at least one second CC being a CC that coincides or overlaps, at least in part, with the second BW portion; and
determine that the BW constraint is satisfied based on the at least one first CC and the at least one second CC being within the threshold CC distance of each other.

20. The network entity of claim 1, wherein:
the threshold distance specifies a threshold band distance,
the source reference signal is configured through a frequency domain container specifying at least one first band the source reference signal, and
the at least one processor is configured to:
determine at least one second band based on the second BW portion, the at least one second band being a band that coincides or overlaps, at least in part, with the second BW portion; and
determine that the BW constraint is satisfied based on the at least one first band and the at least one second band being within the threshold band distance of other.

21. The network entity of claim 1, wherein:
the source reference signal is configured through a frequency domain container specifying at least one first band the source reference signal, and
the at least one processor is configured to:
determine at least one second band based on the second BW portion, the at least one second band being a band that coincides or overlaps, at least in part, with the second BW portion; and
determine that the BW constraint is satisfied based on the at least one first band and the at least one second band being the same.

22. A method of a network entity, the method comprising:
determining whether a source reference signal transmitted from a first transmission-reception point (TRP) is a quasi-collocation (QCL) source of a target reference signal transmitted from a second TRP based, at least in part, on a first bandwidth (BW) portion occupied by the source reference signal and a second BW portion occupied by the target reference signal, the first BW portion having a first start frequency and a first BW size and the second BW portion having a second start frequency and a second BW size, wherein the source reference signal is a first downlink positioning reference signal transmitted on a first downlink transmit beam and the target reference signal is a second downlink positioning reference signal transmitted on a second downlink transmit beam, and wherein it is determined that the source reference signal is the QCL source of the target reference signal based on the source reference signal and the target reference signal satisfying a BW constraint specifying that a first BW portion and the second BW portion be within a threshold distance of each other in a frequency domain; and configuring a user equipment (UE) with the source reference signal as the QCL source of the target reference signal based on a determination that the source reference signal is the QCL source of the target reference signal.

23. The method of claim 22, wherein the network entity is one of a location server, location management function, or a serving TRP.

24. The method of claim 22, wherein, based on a determination that the source reference signal is the QCL source of the target reference signal, the source reference signal is the QCL source with respect to Doppler shift, Doppler spread, average delay, delay spread, spatial receive parameter, or any combination thereof.

25. The method of claim 22, wherein the source reference signal and the target reference signal are downlink positioning reference signals (DL-PRS).

26. The method of claim 22, wherein:
the source reference signal is determined to be the QCL source of the target reference signal based on the source reference signal and the target reference signal satisfying the BW constraint and satisfy a TRP constraint, and
the TRP constraint specifies that the first TRP is the same as the second TRP.

27. The method of claim 22, wherein:
the source reference signal is determined to be the QCL source of the target reference signal based on the source reference signal and the target reference signal satisfying the BW constraint and satisfy a frequency layer constraint, and
the frequency layer constraint specifies that a first frequency layer is the same as a second frequency layer, the first frequency layer being a frequency layer of the source reference signal, and the second frequency layer being a frequency layer of the target reference signal.

28. The method of claim 27, wherein:
the threshold distance is specified as a threshold physical resource block (PRB) distance, a threshold frequency distance, a threshold band distance, a threshold channel distance, or any combination thereof,
the threshold PRB distance specifies a number of PRBs,
the threshold frequency distance specifies a number of HZs,
the threshold band distance specifies a number of bands, and
the threshold channel distance specifies a number of channels.

29. The method of claim 27, wherein the threshold distance is frequency range (FR) specific.

30. The method of claim 29, wherein the threshold distance is less than or equal to 20 MHz for FR1 and is less than or equal to 100 MHz for FR2.

31. The method of claim 27, wherein:
the threshold distance specifies a threshold center distance, and
the BW constraint is determined to be satisfied based on a first BW center and a second BW center being within the threshold center distance of each other, the first BW center being a center of the first BW portion and the second BW center being a center of the second BW portion.

32. The method of claim 31, wherein the threshold center distance is zero such that the BW constraint is satisfied based on the first BW center and the second BW center being the same.

33. The method of claim 27, wherein:
the threshold distance specifies a threshold start distance, and
the BW constraint is determined to be satisfied based on the first start frequency and the second start frequency being within the threshold start distance of each other.

34. The method of claim 33, wherein threshold start distance is zero such that the BW constraint is satisfied based on the first start frequency and the second start frequency being the same.

35. The method of claim 27, wherein:
the threshold distance specifies a threshold end distance, and
the BW constraint is determined to be satisfied based on a first end frequency and a second end frequency being within the threshold end distance of each other, the first end frequency being equal to a sum of the first start frequency and the first BW size, and the second end frequency being equal to a sum of the second start frequency and the second BW size.

36. The method of claim 35, wherein threshold end distance is zero such that the BW constraint is satisfied based on the first end frequency and the second end frequency being the same.

37. The method of claim 27, wherein the BW constraint is determined to be satisfied based on any part of the first BW portion being within the threshold distance of any part of the second BW portion.

38. The method of claim 27, wherein the BW constraint is determined to be satisfied based on there being a non-zero overlap between the first BW portion and the second BW portion.

39. The method of claim 27, wherein:
the source reference signal is configured through a frequency domain container specifying at least one first component carrier (CC), at least one first band, and/or at least one first bandwidth part (BWP) of the source reference signal, and
the method further comprises:
determining the first BW portion based on the at least one first CC, the at least one first band, and/or the at least one first BWP prior to determining whether the BW constraint is satisfied.

40. The method of claim 27, wherein:
the threshold distance specifies a threshold component carrier (CC) distance,
the source reference signal is configured through a frequency domain container specifying at least one first CC of the source reference signal, and
the determining whether the source reference signal is the QCL source of the target reference signal comprises:
determining at least one second CC based on the second BW portion, the at least one second CC being a CC that coincides or overlaps, at least in part, with the second BW portion; and
determining that the BW constraint is satisfied based on the at least one first CC and the at least one second CC being within the threshold CC distance of each other.

41. The method of claim 27, wherein:
the threshold distance specifies a threshold band distance,
the source reference signal is configured through a frequency domain container specifying at least one first band the source reference signal, and
the determining whether the source reference signal is the QCL source of the target reference signal comprises:
determining at least one second band based on the second BW portion, the at least one second band being a band that coincides or overlaps, at least in part, with the second BW portion; and determining that the BW constraint is satisfied based on the at least one first band and the at least one second band being within the threshold band distance of other.

42. The method of claim 27, wherein:

the source reference signal is configured through a frequency domain container specifying at least one first band the source reference signal, and the determining whether the source reference signal is the QCL source of the target reference signal comprises:

determining at least one second band based on the second BW portion, the at least one second band being a band that coincides or overlaps, at least in part, with the second BW portion; and determining that the BW constraint is satisfied based on the at least one first band and the at least one second band being the same.

43. A network entity, comprising:

means for determining whether a source reference signal transmitted from a first transmission-reception point (TRP) is a quasi-collocation (QCL) source of a target reference signal transmitted from a second TRP based, at least in part, on a first bandwidth (BW) portion occupied by the source reference signal and a second BW portion occupied by the target reference signal, the first BW portion having a first start frequency and a first BW size and the second BW portion having a second start frequency and a second BW size, wherein the source reference signal is a first downlink positioning reference signal transmitted on a first downlink transmit beam and the target reference signal is a second downlink positioning reference signal transmitted on a second downlink transmit beam, and wherein it is determined that the source reference signal is the QCL source of the target reference signal based on the source reference signal and the target reference signal satisfying a BW constraint specifying that a first BW portion and the second BW portion be within a threshold distance of each other in a frequency domain; and means for configuring a user equipment (UE) with the source reference signal as the QCL source of the target reference signal based on a determination that the source reference signal is the QCL source of the target reference signal.

44. A non-transitory computer-readable medium storing computer-executable instructions for a network entity, the computer-executable instructions comprising:

one or more instructions instructing the network entity to determine whether a source reference signal transmitted from a first transmission-reception point (TRP) is a quasi-collocation (QCL) source of a target reference signal transmitted from a second TRP based, at least in part, on a first bandwidth (BW) portion occupied by the source reference signal and a second BW portion occupied by the target reference signal, the first BW portion having a first start frequency and a first BW size and the second BW portion having a second start frequency and a second BW size, wherein the source reference signal is a first downlink positioning reference signal transmitted on a first downlink transmit beam and the target reference signal is a second downlink positioning reference signal transmitted on a second downlink transmit beam, and wherein it is determined that the source reference signal is the QCL source of the target reference signal based on the source reference signal and the target reference signal satisfying a BW constraint specifying that a first BW portion and the second BW portion be within a threshold distance of each other in a frequency domain; and one or more instructions instructing the network entity to configure a user equipment (UE) with the source reference signal as the QCL source of the target reference signal based on a determination that the source reference signal is the QCL source of the target reference signal.

\* \* \* \* \*